United States Patent
Kim et al.

(10) Patent No.: US 10,602,563 B2
(45) Date of Patent: Mar. 24, 2020

(54) METHOD AND APPARATUS FOR SUPPORTING RLC UM MODE OPERATION IN NEXT GENERATION MOBILE COMMUNICATION SYSTEM

(71) Applicant: Samsung Electronics Co., Ltd., Suwon-si, Gyeonggi-do (KR)

(72) Inventors: Donggun Kim, Seoul (KR); Soenghun Kim, Suwon-si (KR); Sangbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 16/003,743

(22) Filed: Jun. 8, 2018

(65) Prior Publication Data
US 2018/0359801 A1 Dec. 13, 2018

(30) Foreign Application Priority Data

Jun. 9, 2017 (KR) ........................ 10-2017-0072581
Jun. 23, 2017 (KR) ........................ 10-2017-0079480

(51) Int. Cl.
*H04W 76/20* (2018.01)
*H04L 29/06* (2006.01)
*H04L 12/801* (2013.01)
*H04W 28/06* (2009.01)
*H04L 12/805* (2013.01)

(52) U.S. Cl.
CPC ............ *H04W 76/20* (2018.02); *H04L 47/34* (2013.01); *H04L 69/22* (2013.01); *H04W 28/065* (2013.01); *H04L 47/36* (2013.01)

(58) Field of Classification Search
None
See application file for complete search history.

(56) References Cited

U.S. PATENT DOCUMENTS

| 2005/0201353 | A1* | 9/2005 | Lee | ................. | H04L 1/0018 |
| | | | | | 370/349 |
| 2016/0066203 | A1* | 3/2016 | Yoon | ................ | H04W 76/19 |
| | | | | | 370/216 |
| 2017/0310421 | A1* | 10/2017 | Froberg Olsson | .................... |
| | | | | | H04L 12/4625 |

OTHER PUBLICATIONS

Huawei et al: "RLC PDU Format", 3GPP Draft; R2-1702609, 3rd Generation Partnership Project (3GPP), Mobile Competence Centre ; 650, Route Des Lucioles ; F-06921 Sophia-Antipolis Cedex ; France, vol. RAN WG2, No. Spokane, USA; Apr. 3, 2017-Apr. 7, 2017 Apr. 3, 2017, XP051244611.

(Continued)

*Primary Examiner* — Anh Ngoc M Nguyen
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as a smart home, a smart building, a smart city, a smart car, a connected car, health care, digital education, a smart retail, security and safety services.

12 Claims, 23 Drawing Sheets

(56) References Cited

OTHER PUBLICATIONS

LG Electronics Inc: "Further considerations on SO based segmentation", 3GPP Draft; R2-1701460, Further Considerations on SO Based Segmentation, 3rd Generation Partnership Project (3GPP), Mobile Competence Centre ; 650, Route Des Lucioles ; F-06921 Sophia-Antipolis Cedex ;, vol. RAN WG2 No. Athens, Greece; Feb. 13, 2017-Feb. 17, 2017 Feb. 12, 2017, XP051212095.

Huawei et al: "Overhead reduction for RLC UM transmission" 3GPP Draft; R2-1705208, Overhead Reouction for RLC UM Transmission, 3rd Generation Partnership Project (3GPP), Mobile Competence Centre ; 650, Route Des Lucioles ; F-06921 Sophia-Antipolis Cedex ; Fran, vol. RAN WG2, No. Hangzhou, China; May 15, 2017-May 19, 2017 May 14, 2017 (May 14, 2017), XP051275683.

Nokia et al: "Segmentation implications to RLC status reporting", 3GPP Draft; R2-1705219, Segmentation Implications to RLC Status Reporting_V1, 3rd Generation Partnership Project (3GPP), Mobile Competence Centre ; 650, Route Des Lucioles ; F-06921 Sophia-Antipolis CE, vol. RAN WG2, No. Hangzhou, China; May 15, 2017-May 19, 2017 May 14, 2017 (May 14, 2017), XP051275693.

Extended EP Search Report dated Oct. 12, 2018 issued in EP Application No. 18177080.1.

* cited by examiner

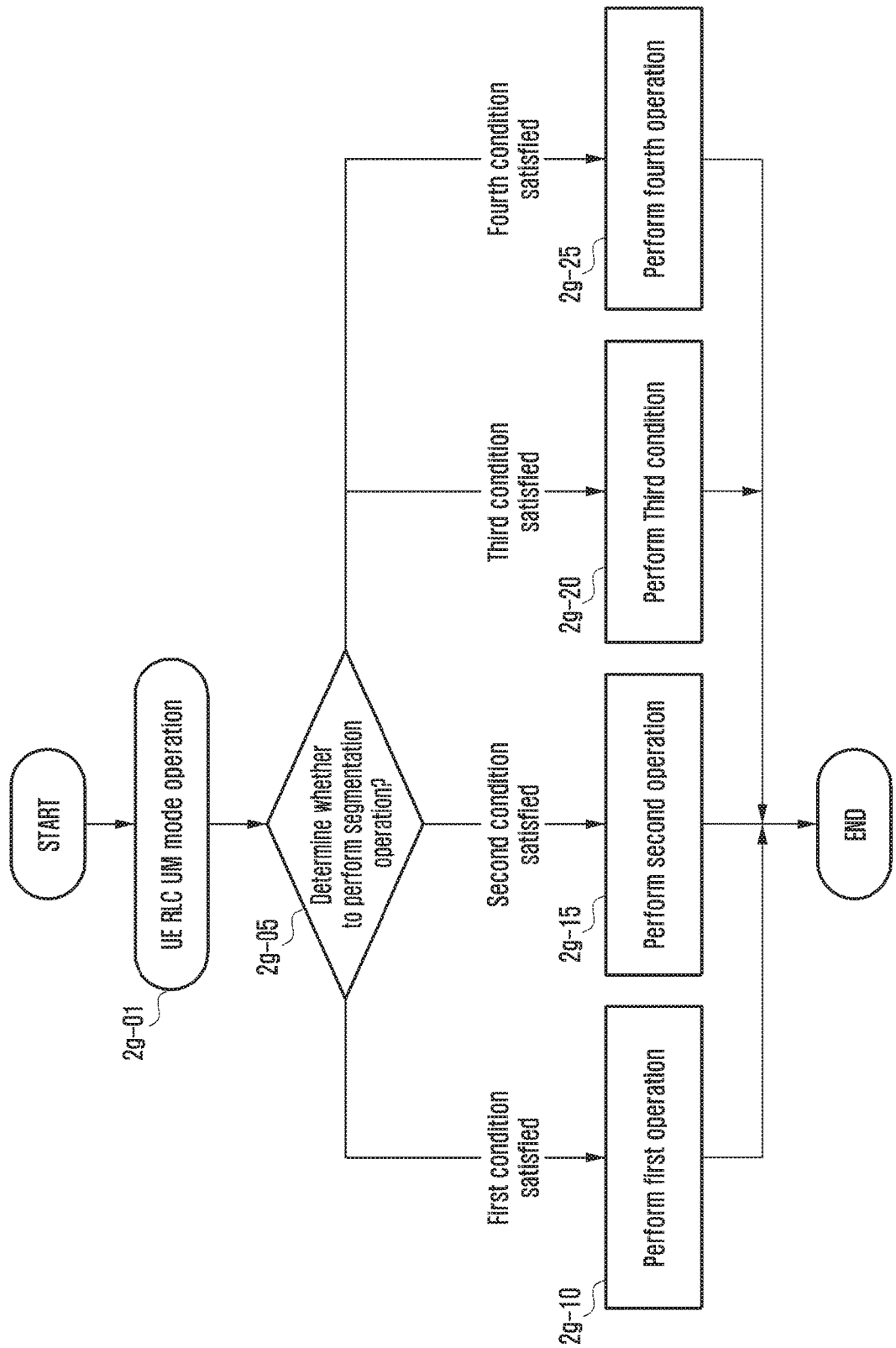

- For extremely power saving, UE in PSM stops all IDLE procedures
- It is suitable for PSM to be applied to the use case where the UE wakes up every a few hours or a few days because the UE always requires a negotiation with MME in order to initiate PSM.

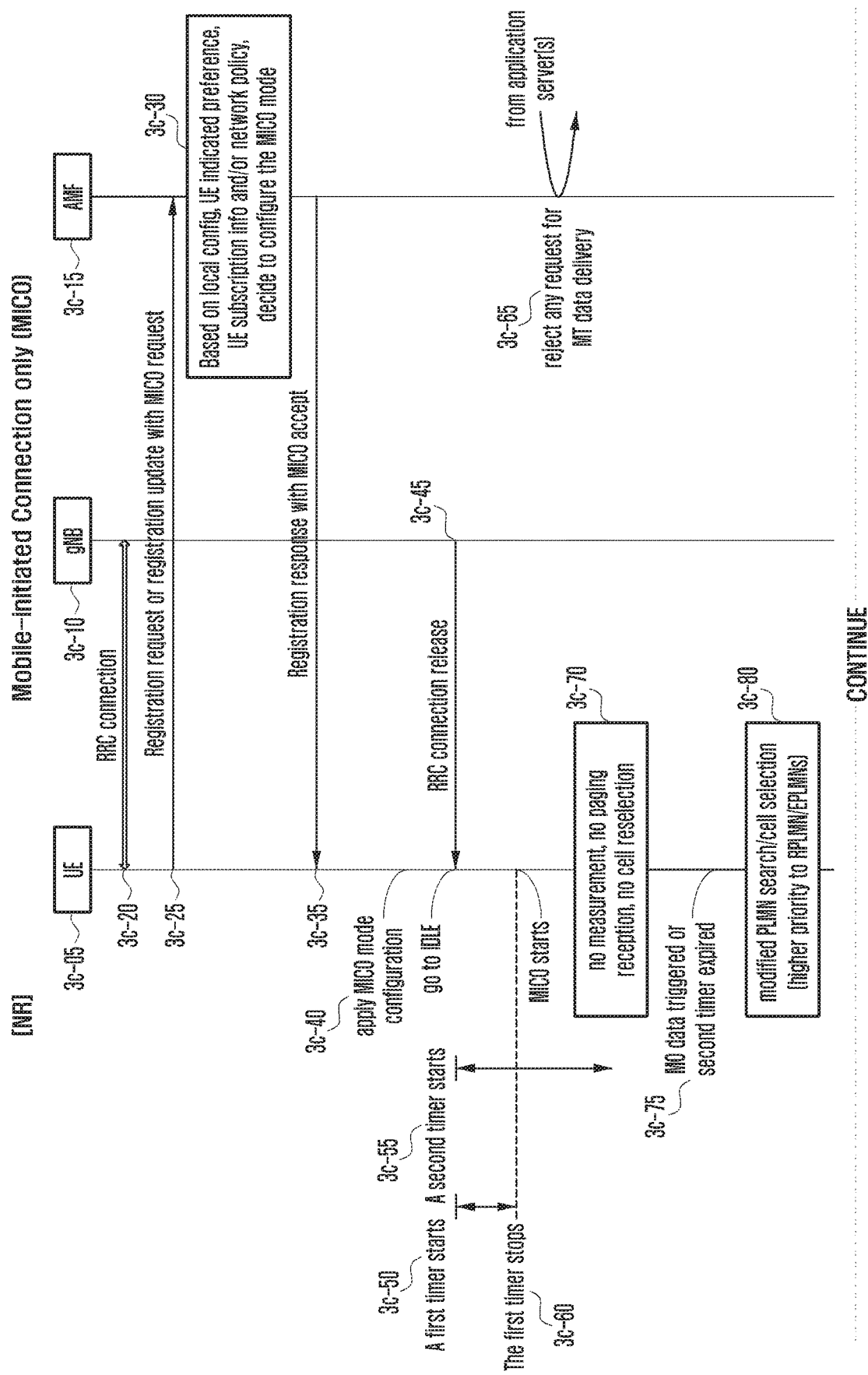

FIG. 3CB

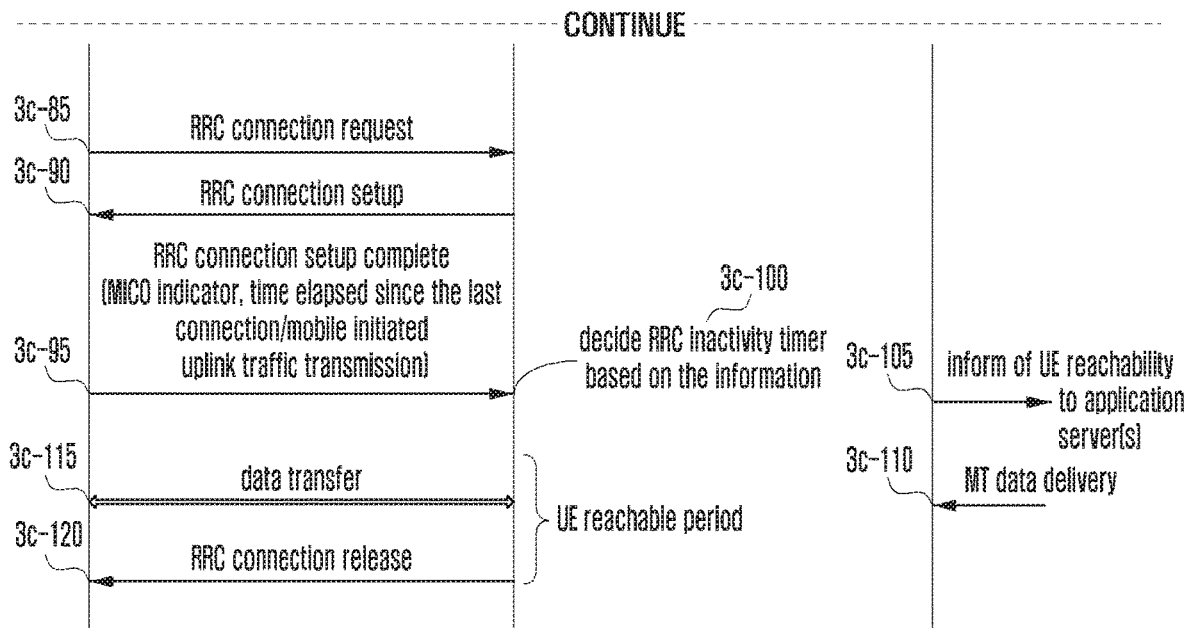

Difference between MICO and PSM
- In MICO, it is assumed that the re-negotiation is not needed every wake-up
- One open issue is how long UE stays in connected every wake-up:
  It would depend on how long UE stays in MICO, i.e. the longer the MICO period is, the more data stands by First patent point
- UE reports MICO indicator and time elapsed since the last connection or mobile uplink traffic transmission
- gNB decides the period of RRC inactivity timer based on the above information Second patent point
- PLMN search/cell selection can be modified

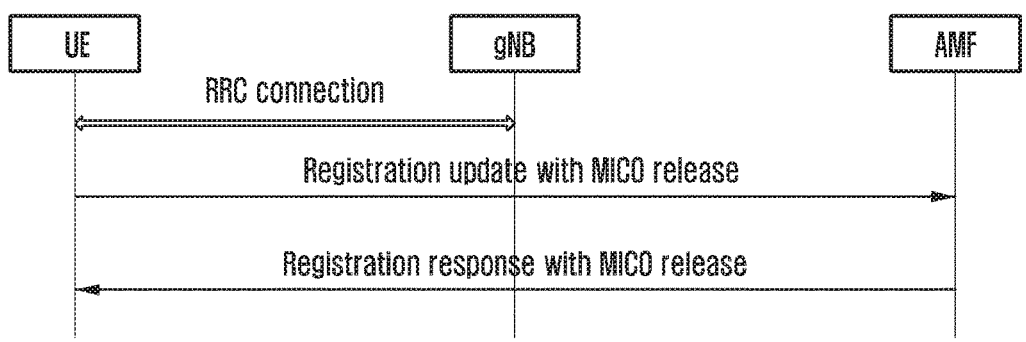

METHOD AND APPARATUS FOR SUPPORTING RLC UM MODE OPERATION IN NEXT GENERATION MOBILE COMMUNICATION SYSTEM

CROSS-REFERENCE TO RELATED APPLICATION(S)

This application is based on and claims priority under 35 U.S.C. § 119(a) of the Korean patent application number 10-2017-0072581, filed on Jun. 9, 2017, and claims priority under 35 U.S.C § 119(a) of the Korean patent application number 10-2017-0079480, filed on Jun. 23, 2017, in the Korean Intellectual Property Office, the disclosure of which is incorporated by reference herein in its entirety.

BACKGROUND

1. Field

The disclosure proposes a method and an apparatus for supporting a radio link control (RLC) unacknowledged mode (UM mode) operation in a next generation mobile communication system. More particularly, the disclosure relates to an apparatus and method for a new RLC UM mode operation capable of reducing overhead and the unnecessary processing of a user equipment (UE) in a next generation mobile communication system.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid FSK and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for a new radio link control (RLC) unacknowledged mode (UM mode) operation capable of reducing overhead and the unnecessary processing of a UE in a next generation mobile communication system.

Additional aspects will be set forth in part in the description which follows and, in part, will be apparent from the description, or may be learned by practice of the presented embodiments.

In accordance with an aspect of the disclosure, a method by an RLC entity in a wireless communication system is provided. The method comprises determining whether to segment an RLC service data unit (SDU), when the RLC SDU is segmented into a plurality of segments, including a sequence number field in a header of each segment of the plurality of segments, and when the RLC SDU is not segmented into the plurality of the segments, including a segmentation information (SI) field in the header of the RLC SDU.

A first segment of the RLC SDU is not include a segmentation offset (SO) field in a header of the first segment.

In accordance with another aspect of the disclosure, the method further comprises receiving information on a bit of the sequence number field on a higher layer signaling.

In accordance with another aspect of the disclosure, the method further comprises maintaining a variable value associated with the sequence number field, when the RLC SDU is not segmented into the plurality of the segments.

The sequence number field in a header of each segment of the plurality of segments is an identical value.

In accordance with another aspect of the disclosure, the method further comprises identifying an order of each segment of the plurality of segments, and when a segment is last segment of the RLC SDU, changing the variable value associated with the sequence number field.

In accordance with an aspect of the disclosure, a method by an RLC entity in a wireless communication system is provided. The method comprises receiving an RLC protocol data unit (PDU), identifying whether the RLC PDU is segmented based on segmentation information (SI) included in a header of the RLC PDU and when the RLC PDU is not segmented, transmitting the RLC service data unit (SDU) included in the RLC PDU to a higher layer.

In accordance with another aspect of the disclosure, the method further comprises when the RLC PDU is segmented, processing the RLC PDU based on a window and a timer.

In accordance with an aspect of the disclosure, an electronic device including an RLC entity is provided. The electronic device comprises a transceiver and at least one processor configured to determine whether to segment an RLC service data unit (SDU), when the RLC SDU is segmented into a plurality of segments, include a sequence number field in a header of each segment of the plurality of segments, and when the RLC SDU is not segmented into the plurality of the segments, include a segmentation information (SI) field in the header of the RLC SDU.

A first segment of the RLC SDU is not include a segmentation offset (SO) field in a header of the first segment.

The at least one processor is further configured to control the transceiver to receive information on a bit of the sequence number field on a higher layer signaling.

The at least one processor is further configured to, when the RLC SDU is not segmented into the plurality of the segments, maintain a variable value associated with the sequence number field.

The sequence number field in a header of each segment of the plurality of segments is an identical value.

The at least one processor is further configured to identify an order of each segment of the plurality of segments, and when an identified segment is last segment of the RLC SDU, change the variable value associated with the sequence number field.

In accordance with an aspect of the disclosure, an electronic device including an RLC entity is provided. The electronic device comprises a transceiver and a controller configured to control the transceiver to receive an RLC PDU, identify whether the RLC PDU is segmented based on segmentation information (SI) included in a header of the RLC PDU, and when the RLC PDU is not segmented, transmit the RLC service data unit (SDU) included in the RLC PDU to a higher layer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2G is a diagram illustrating a transmission operation of an RLC UM mode UE according to an embodiment of the disclosure.

FIG. 2I illustrates a structure of a UE according to an embodiment of the disclosure.

FIGS. 3CA and 3CB are diagrams illustrating a process of performing mobile-initiated connection according to an embodiment of the disclosure.

Throughout the drawings, like reference numerals will be understood to refer to like parts, components, and structures.

DETAILED DESCRIPTION

Figure 1:
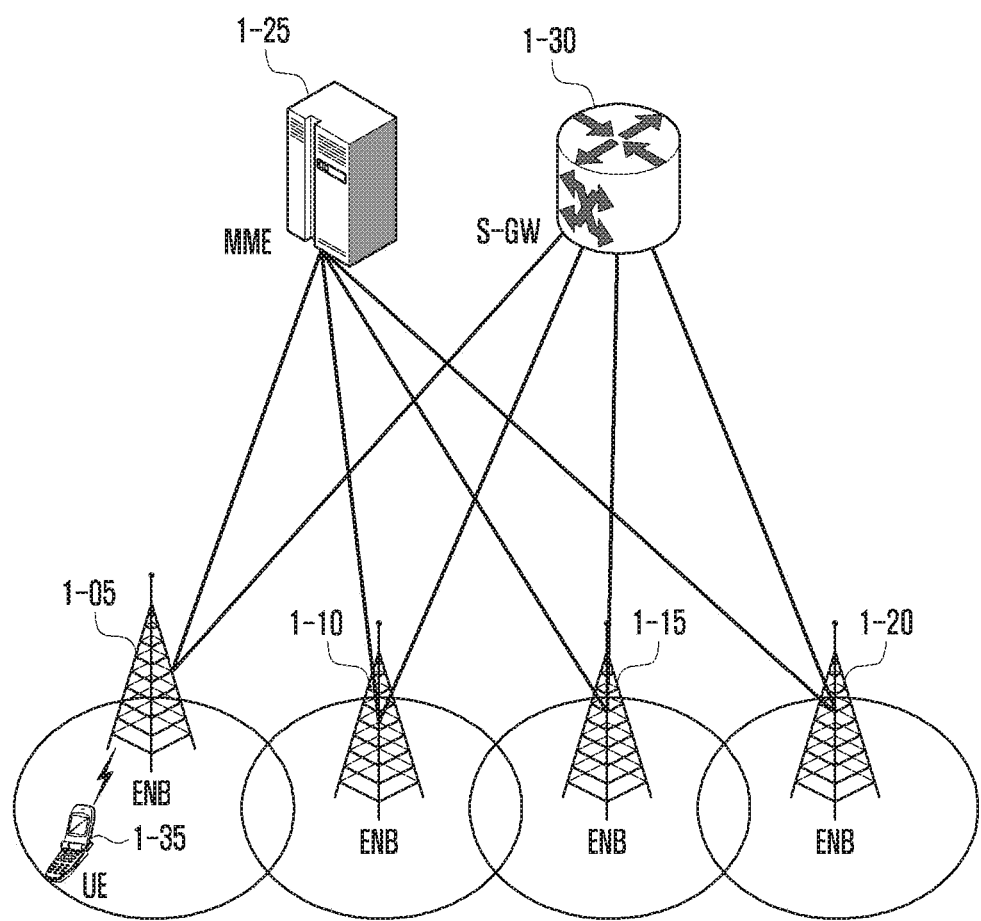
FIG. 1 is a diagram illustrating a structure of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The merits and characteristics of the disclosure and a method of achieving the merits and characteristics will become more apparent from the embodiments described hereunder in conjunction with the accompanying drawings. However, the disclosure is not limited to the embodiments of the disclosure, but may be implemented in various different ways. The embodiments are provided to only complete the disclosure and to allow those skilled in the art to fully understand the category of the disclosure. The disclosure is defined by the category of the claims. The same reference numerals will be used to refer to the same or similar elements throughout the specification.

In an embodiment of the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded into a computer or other programmable data processing apparatus to cause a series of operations to be performed on the computer or other programmable apparatus to produce a computer-executed process, so that the instructions performing the computer or other programmable apparatus provide operations for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

The term "unit", as used in the embodiment means software or a hardware component, such as a field programmable gate array (FPGA) or an application-specific integrated circuit (ASIC), and the "unit" performs specific tasks. However, "unit" does not mean to be limited to software or hardware. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "~units" may be combined into fewer components and "~units" or may be further separated into additional components and "~units." Furthermore, the components and "~units" may be implemented to operate on one or more central processing units (CPUs) within a device or a security multimedia card.

Furthermore, in describing the embodiments of the disclosure, an orthogonal frequency division multiplexing (OFDM)-based wireless communication system, more specifically, the $3^{rd}$ generation partnership project (3GPP) evolved universal terrestrial radio access (EUTRA) standard will be chiefly described, but the main gist of the disclosure may be applied to other communication systems having a similar technical background and channel form with a slight modification within a scope that does not greatly depart from the scope of the disclosure. This may be possible by those skilled in the art to which the disclosure pertains.

Hereinafter, some embodiments of the disclosure are described with reference to the accompanying drawings. In describing the disclosure, a detailed description of a related known function or configuration related to the disclosure will be omitted if it is deemed to make the gist of the disclosure unnecessarily vague. Furthermore, terms to be described hereunder have been defined by taking into consideration functions in an embodiment of the disclosure, and may be different depending on a user, an operator's intention or practice. Accordingly, each term should be defined based on contents over the entire specification. In the following description, a term to identify an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used.

Hereinafter, for convenience of description, in embodiments of the disclosure, terms and names defined in the 3GPP long term evolution (3GPP LTE) standard or terms and names modified from the defined terms and names are used. However, the disclosure is not limited to the terms and names and may be identically applied to systems based on other standards. In one embodiment of the disclosure, an evolved node B (ENB) may be interchangeably used with a gNB for convenience of description. For example, the ENB may indicate a gNB.

First Embodiment

FIG. 1 is a diagram illustrating a structure of an LTE system according to an embodiment of the disclosure.

Referring to FIG. 1, the radio access network of the LTE system includes next-generation evolved Node Bs 1-05, 1-10, 1-15, and 1-20, a mobility management entity (MME) 1-25, and a serving-gateway (S-GW) 1-30. A user equipment (hereinafter referred to as a "UE or terminal") 1-35 accesses an external network through the ENBs 1-05~1-20 and the S-GW 1-30.

In FIG. 1, the ENBs 1-05~1-20 correspond to the Node Bs of the existing UMTS system. The ENB is connected to the UE 1-35 through a radio channel and performs a more complex function than the existing Node B. In the LTE system, all of types of user traffic including a real-time service, such as voice over IP (VoIP), through the Internet protocol, are served through a shared channel. Accordingly, a device that performs schedules by collecting state information, such as the buffer state, available transmission power state, and channel state of UEs, is necessary. The ENBs 1-05~1-20 are in charge of such a device. In general, one ENB controls multiple cells. For example, in order to implement the transfer rate of 100 Mbps, the LTE system uses orthogonal frequency division multiplexing (hereinafter referred to as "OFDM") as a radio access technology in the 20 MHz bandwidth, for example. Furthermore, the LTE system adopts an adaptive modulation & coding (hereinafter referred to as "AMC") scheme for determining a modulation scheme and a channel coding rate based on the channel state of a UE. The S-GW 1-30 provides a data bearer and generates or removes a data bearer under the control of the MME 1-25. The MME is in charge of various control functions in addition to a mobility management function for a UE, and is connected to multiple ENBs.

Figure 2A:
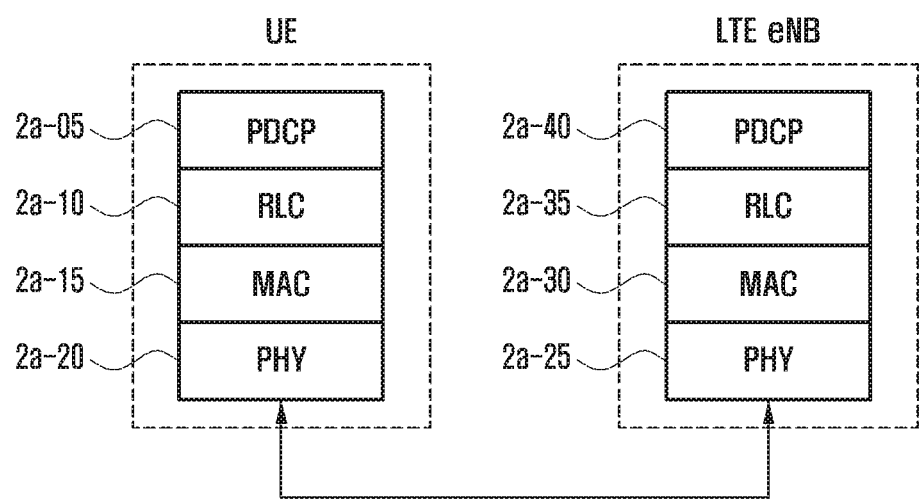
FIG. 2A is a diagram illustrating a radio protocol structure in an LTE system according to an embodiment of the disclosure.

FIG. 2A is a diagram illustrating a radio protocol structure in an LTE system according to an embodiment of the disclosure.

Referring to FIG. 2A, the radio protocol of the LTE system includes packet data convergence protocols (PDCPs) 2a-05 and 2a-40, radio link control (RLC) 2a-10 and 2a-35, and medium access control 2a-15 and 2a-30 in a UE and an ENB, respectively. The PDCPs 2a-05 and 2a-40 are in charge of an operation, such as IP header compression/restoration. Major functions of the PDCP are summarized as follows.
  Header compression and decompression: robust header compression (ROHC) only
  Transfer of user data
  In-sequence delivery of upper layer PDUs in a PDCP re-establishment procedure for RLC AM
  Reordering function (for split bearers in DC (only support for RLC AM): PDCP PDU routing for transmission and PDCP PDU reordering for reception)
  Duplicate detection of lower layer SDUs in a PDCP re-establishment procedure for RLC AM
  Retransmission of PDCP SDUs at handover and, for split bearers in DC, of PDCP PDUs in a PDCP data-recovery procedure, for RLC AM
  Ciphering and deciphering
  Timer-based SDU discard in uplink.

The RLC 2a-10 and 2a-35 reconfigures a PDCP packet data unit (PDU) in a proper size and performs an automatic repeat request (ARQ) operation. Major functions of the RLC are summarized as follows.
  Transfer of upper layer PDUs
  ARQ function (Error Correction through ARQ (only for acknowledge mode (AM) data transfer))
  Concatenation, segmentation and reassembly of RLC SDUs (only for radio link control (UM) and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM data transfer)
  RLC re-establishment The MAC 2a-15 and 2a-30 are connected to multiple RLC layer devices configured in one UE, and performs an operation of multiplexing RLC PDUs with a MAC PDU and demultiplexing RLC PDUs from a MAC PDU. Major functions of the MAC are summarized as follows.
  Mapping between logical channels and transport channels
  Multiplexing/demultiplexing of MAC SDUs belonging to one or different logical channels into/from transport blocks (TB) delivered to/from the physical layer on transport channels)
  Scheduling information reporting
  Error correction through HARQ
  Priority handling between logical channels of one UE
  Priority handling between UEs by means of dynamic scheduling
  multimedia broadcast multicast service (MBMS) service identification
  Transport format selection
  Padding A physical layer 2a-20, 2a-25 performs an operation of channel-coding and modulating higher layer data, generating the higher layer data into an OFDM symbol, and transmitting the OFDM symbol through a radio channel or demodulating an OFDM symbol received through a radio channel, channel-decoding the OFDM symbol, and transmitting the optical pulse division multiplexing (OPDM) symbol to a higher layer.

Figure 2B:
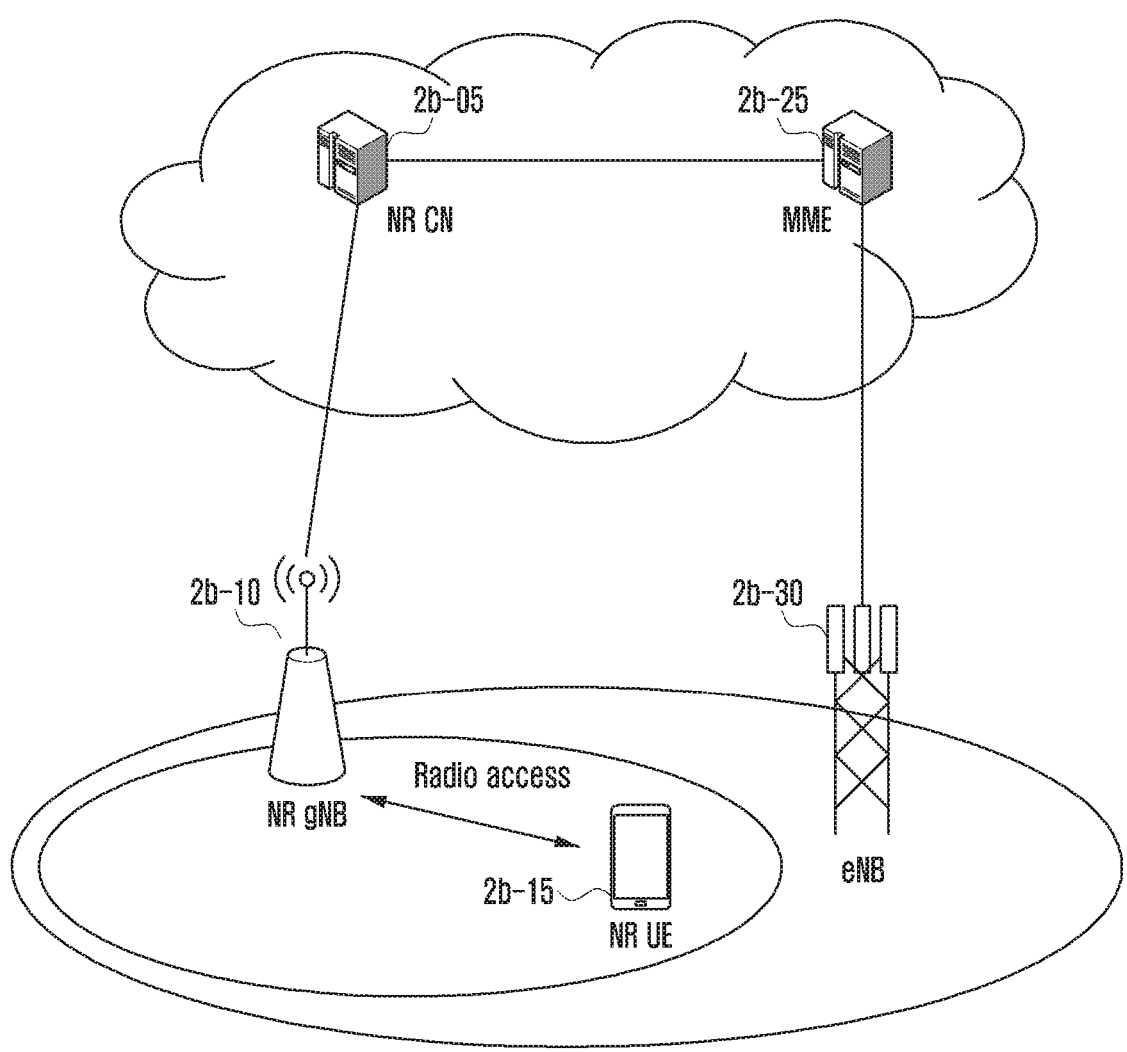
FIG. 2B is a diagram illustrating a structure of a next generation mobile communication system according to an embodiment of the disclosure.

FIG. 2B is a diagram illustrating a structure of a new mobile communication system according to an embodiment of the disclosure.

Referring to FIG. 2B, the radio access network of the new mobile communication system (hereinafter referred to as an "NR or 5G") includes a new radio Node B (hereinafter referred to as "NR gNB or NR ENB") 2b-10, an NR CN 2b-05, and a new radio core network. A new radio user equipment (hereinafter referred to as an "NR UE or terminal") 2b-15 accesses an external network through the NR gNB 2b-10 and the NR CN 2b-05.

In FIG. 2B, the NR gNB 2b-10 corresponds to an ENB of the existing LTE system. The NR gNB is connected to the NR UE 2b-15 through a radio channel, and may provide an excellent service compared to the existing Node B. The NR or 5G requires a device for performing scheduling by collecting state information, such as the buffer state, available transmission power state, and channel state of UEs, because all of types of user traffic are served through a shared channel. The NR gNB 2b-10 is in charge of the device. In general, one NR gNB controls multiple cells. In order to implement ultra-high speed data transfer compared to LTE, the NR or 5G uses the existing maximum bandwidth or more and additionally grafts the beamforming technology using OFDM as a radio access technology. Furthermore, the NR or 5G adopts the AMC scheme that determines a modulation scheme and a channel coding rate based on the channel state of a UE. The NR CN 2b-05 performs functions, such as mobility support, a bearer configuration, and a quality of service (QoS) configuration. The NR CN is in charge of various control functions in addition to a mobility management function for a UE, and is connected to multiple ENBs. Furthermore, the NR or 5G may also operate in conjunction with the existing LTE system. The NR CN is connected to an MME 2b-25 through a network interface. The MME is connected to an eNB 2b-30, that is, the existing ENB.

Figure 2C:
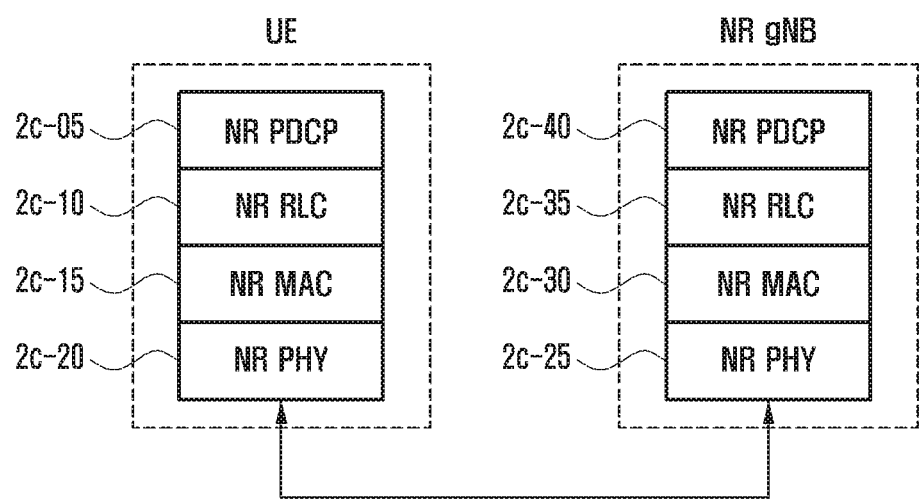
FIG. 2C is a diagram illustrating a radio protocol structure of a next generation mobile communication system (NR or 5G) according to an embodiment of the disclosure.

FIG. 2C is a diagram illustrating a radio protocol structure of a next generation mobile communication system (NR or 5G) according to an embodiment of the disclosure.

Referring to FIG. 2C, the radio protocol of the NR or 5G include NR PDCPs 2c-05 and 2c-40, NR RLCs 2c-10 and 2c-35, and NR MACs 2c-15 and 2c-30 in a UE and an NR ENB, respectively. Major functions of the NR PDCP 2c-05, 2c-40 may include some of the following functions.

Header compression and decompression: ROHC only
    Transfer of user data
    In-sequence delivery of upper layer PDUs
    Out-of-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink.

The reordering function of the NR PDCP device refers to a function of sequentially reordering PDCP PDUs received from a lower layer based on a PDCP sequence number (SN). The reordering function may include a function of transmitting data in a reordered sequence to a higher layer or a function of directly transmitting the data to a higher layer without taking the order into consideration, a function of reordering orders and recording lost PDCP PDUs, a function of making a status report on lost PDCP PDUs to the transmission side, and a function of requesting the retransmission of lost PDCP PDUs.

Major functions of the NR RLC 2c-10, 2c-35 may include some of the following functions.

Transfer of upper layer PDUs
    In-sequence delivery of upper layer PDUs
    Out-of-sequence delivery of upper layer PDUs
    Error Correction through ARQ
    Concatenation, segmentation and reassembly of the RLC SDUs
    Re-segmentation of RLC data PDUs
    Reordering of RLC data PDUs
    Duplicate detection
    Protocol error detection
    RLC SDU discard
    RLC re-establishment The in-sequence delivery function of the NR RLC device refers to a function of sequentially transmitting RLC SDUs received from a lower layer to a higher layer, and may include a function of reassembling and transmitting multiple RLC SDUs if one RLC SDU has been originally segmented into the multiple RLC SDUs and received. The in-sequence delivery function may include a function of reordering received RLC PDUs based on an RLC sequence number (SN) or a PDCP sequence number (SN), a function of reordering orders and recording lost RLC PDUs, a function of transmitting a status report on lost RLC PDUs to the transmission side, a function of requesting the retransmission of lost RLC PDUs, a function of sequentially transmitting only RLC SDUs prior to a lost RLC SDU to a higher layer when the lost RLC SDU occurs, a function of sequentially transmitting all of RLC SDUs received until a given timer expires to a higher layer when the timer expires although there is a lost RLC SDU, and a function of sequentially transmitting all of RLC SDUs received so far to a higher layer when a given timer expires although there is a lost RLC SDU. Furthermore, the in-sequence delivery function may include a function of processing RLC PDUs in order that the RLC PDUs are received (in order of arrival regardless of the order of a serial number and sequence number) and transmitting the RLC PDUs to a PDCP device regardless of their orders (i.e., out-of sequence delivery). The in-sequence delivery function may include a function of receiving segments stored in a buffer or segments to be received subsequently, reconfiguring the segments in one complete RLC PDU, processing the RLC PDU, and transmitting the RLC PDU to the PDCP device. The NR RLC layer may not include a concatenation function. The concatenation function may be performed by the NR MAC layer or may be substituted with the multiplexing function of the NR MAC layer.

The out-of-sequence delivery function of the NR RLC device refers to a function of directly transmitting RLC SDUs received from a lower layer to a higher layer regardless of their orders. The out-of-sequence delivery function may include a function of reassembling multiple RLC SDUs if one RLC SDU has been originally segmented into the multiple RLC SDUs and received. The out-of-sequence delivery function may include a function of storing the RLC SNs or PDCP SNs of received RLC PDUs, reordering their orders, and recording lost RLC PDUs.

The NR MAC 2c-15, 2c-30 may be connected to multiple NR RLC layer devices configured in one UE. Major functions of the NR MAC may include some of the following functions.

Mapping between logical channels and transport channels
    Multiplexing/demultiplexing of the MAC SDUs
    Scheduling information reporting
    Error correction through HARQ
    Priority handling between logical channels of one UE
    Priority handling between the UEs by means of dynamic scheduling
    MBMS service identification
    Transport format selection
    Padding The NR PHY layer 2c-20, 2c-25 may perform an operation of channel-coding and modulating higher layer data, generating the higher layer data into an OFDM symbol, and transmitting the OFDM symbol to a radio channel or demodulating an OFDM symbol received through a radio channel, channel-decoding the OFDM symbol, and transferring the OFDM symbol to a higher layer.

Figure 2D:
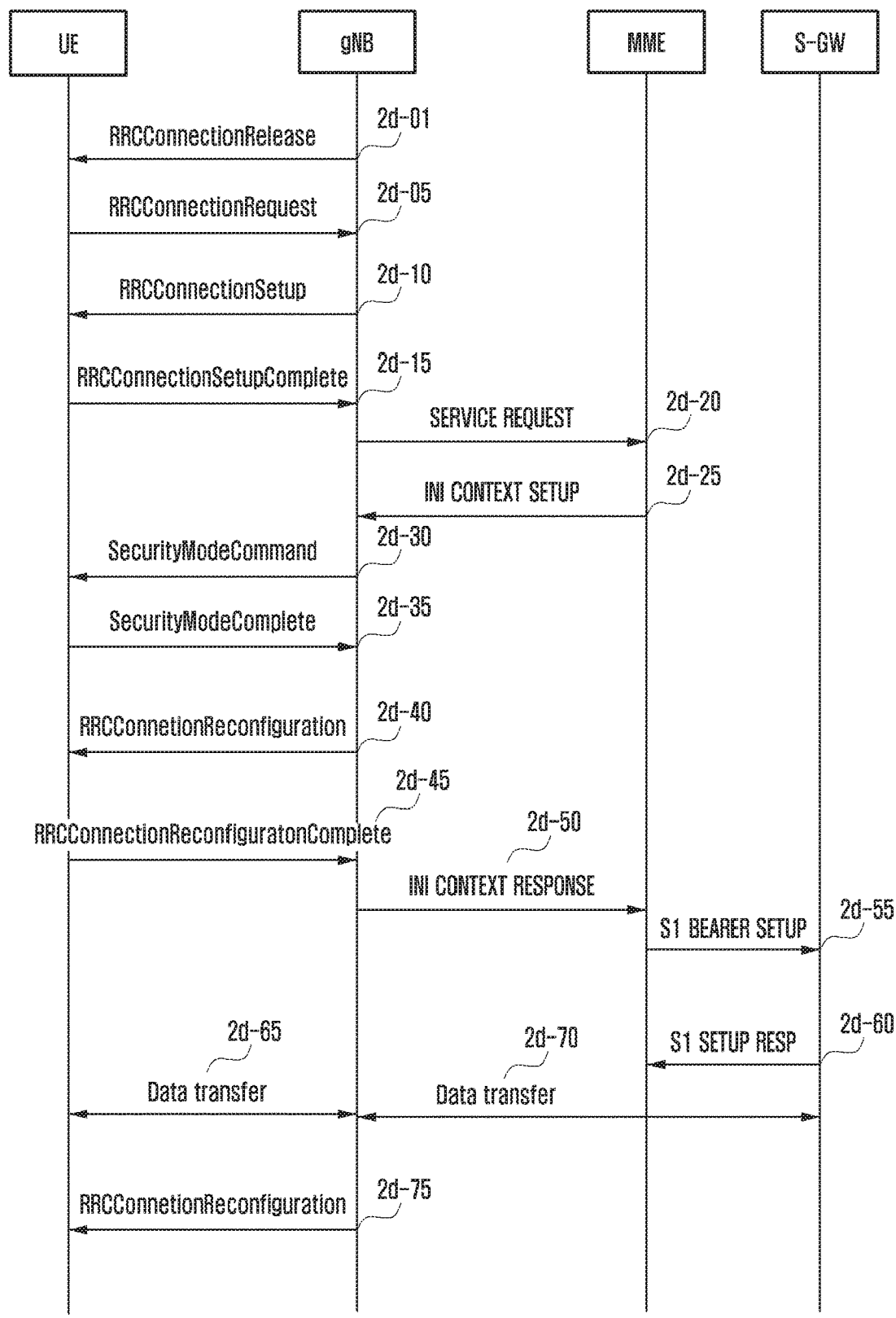
FIG. 2D is a diagram illustrating a procedure for a user equipment (UE) to switch from a radio resource control (RRC) idle mode to an RRC connected mode and to establish a connection with a network according to an embodiment of the disclosure.

FIG. 2D is a diagram illustrating a procedure for a UE to switch from an RRC idle mode to an RRC connected mode and to establish a connection with a network according to an embodiment of the disclosure.

Referring to FIG. 2D, when there is no transmission/reception of data from the UE that transmits/receives data in an RRC connected mode for a given reason or for given time, an ENB may transmit an RRCConnectionRelease message to the UE so that the UE switches to an RRC idle mode in operation 2d-01. When data to be subsequently transmitted occurs in the UE having a connection established (hereinafter referred to as an "idle mode UE"), the UE performs an RRC connection establishment process with the ENB. The UE establishes backward transmission synchronization with the ENB through a random access process and transmits an RRCConnectionRequest message to the ENB in operation 2d-05. The message includes the identifier of the UE and a cause (establishmentCause) for connection establishment. The ENB transmits an RRCConnectionSetup message to the UE so that it sets up an RRC connection in operation 2d-10. The message may include information, such as the length of an RLC serial number to be used when the RLC UM mode for each service/bearer/RLC device or logical channel, the length of an SO field applied when a segmentation operation is performed, a timer value when a reception stage uses a timer (i.e., reassembly timer) in the RLC UM mode, an indicator indicating whether to use an RLC serial number with respect to a complete RLC PDU, information to set a VT(S) variable to be used by a transmission stage in the RLC UM mode, and an initial value.

Furthermore, the message includes RRC connection configuration information. The RRC connection is also called a signaling radio bearer (SRB), and is used for the transmission/reception of an RRC message, that is, a control message between the UE and the ENB. The UE that has set up the RRC connection transmits an RRCConnetionSetupComplete message to the ENB in operation 2d-15. The message includes a control message called "SERVICE REQUEST" that the UE requests a bearer configuration for a given service from an MME. The ENB transmits the SERVICE REQUEST message, included in the RRCConnetionSetupComplete message, to the MME in operation 2d-20. The MME determines whether to provide the service requested by the UE. If, as a result of the determination, the MME has determined to provide the service requested by the UE, the MME transmits an INITIAL CONTEXT SETUP REQUEST message to the ENB in operation 2d-25. The message includes QoS information applied when a data radio bearer (DRB) is configured and security-related information (e.g., a security key and/or a security algorithm) to be applied to a DRB. In order to configure security with the UE, the ENB exchanges a SecurityModeCommand message in operation 2d-30 and a SecurityModeComplete message in operation 2d-35. When the security configuration is completed, the ENB transmits an RRCConnectionReconfiguration message to the UE in operation 2d-40. The message include information, such as the length of an RLC serial number to be used when the RLC UM mode is used for each service/bearer/RLC device or logical channel, the length of an SO field to be applied when a segmentation operation is performed, a timer value when a timer (i.e., reassembly timer) is used by a reception stage in the RLC UM mode, an indicator indicating whether to use an RLC serial number with respect to a complete RLC PDU, information to set a VT(S) variable to be used by a transmission stage in the RLC UM mode, and an initial value.

Furthermore, the message includes information on the configuration of a DRB on which user data will be processed. The UE configures a receiver decoding block (RDB) by applying the information, and transmits an RRCConnectionReconfigurationComplete message to the ENB in operation 2d-45. The ENB that has completed the DRB configuration with the UE transmits an INITIAL CONTEXT SETUP COMPLETE message to the MME in operation 2d-50. The MME that has received the INITIAL CONTEXT SETUP COMPLETE message exchanges an S1 BEARER SETUP message and an S1 BEARER SETUP RESPONSE message with an S-GW in order to configure an S1 bearer with the S-GW in operations 2d-55, 2d-60. The S1 bearer is a connection for data transfer set up between the S-GW and the ENB, and corresponds to a DRB in a 1-to-1 manner. When the process is completed, the UE transmits/receives data to/from the ENB through the S-GW in operations 2d-65, 2d-70. As described above, a common data transfer process basically includes the three operations of an RRC connection configuration, a security configuration, and a DRB configuration. Furthermore, the ENB may transmit the RRCConnectionReconfiguration message in order to newly perform a configuration for the UE a given cause or add or change a configuration in operation 2d-75. The message may include information, such as the length of an RLC serial number to be used when the RLC UM mode is used for each service/bearer/RLC device or logical channel, the length of an SO field applied when a segmentation operation is performed, a timer value when a timer (i.e., reassembly timer) is used by a reception stage in the RLC UM mode, an indicator indicating whether to use an RLC serial number with respect to a complete RLC PDU, information to set a VT(S) variable to be used by a transmission stage in the RLC UM mode, and an initial value.

Figure 2E:
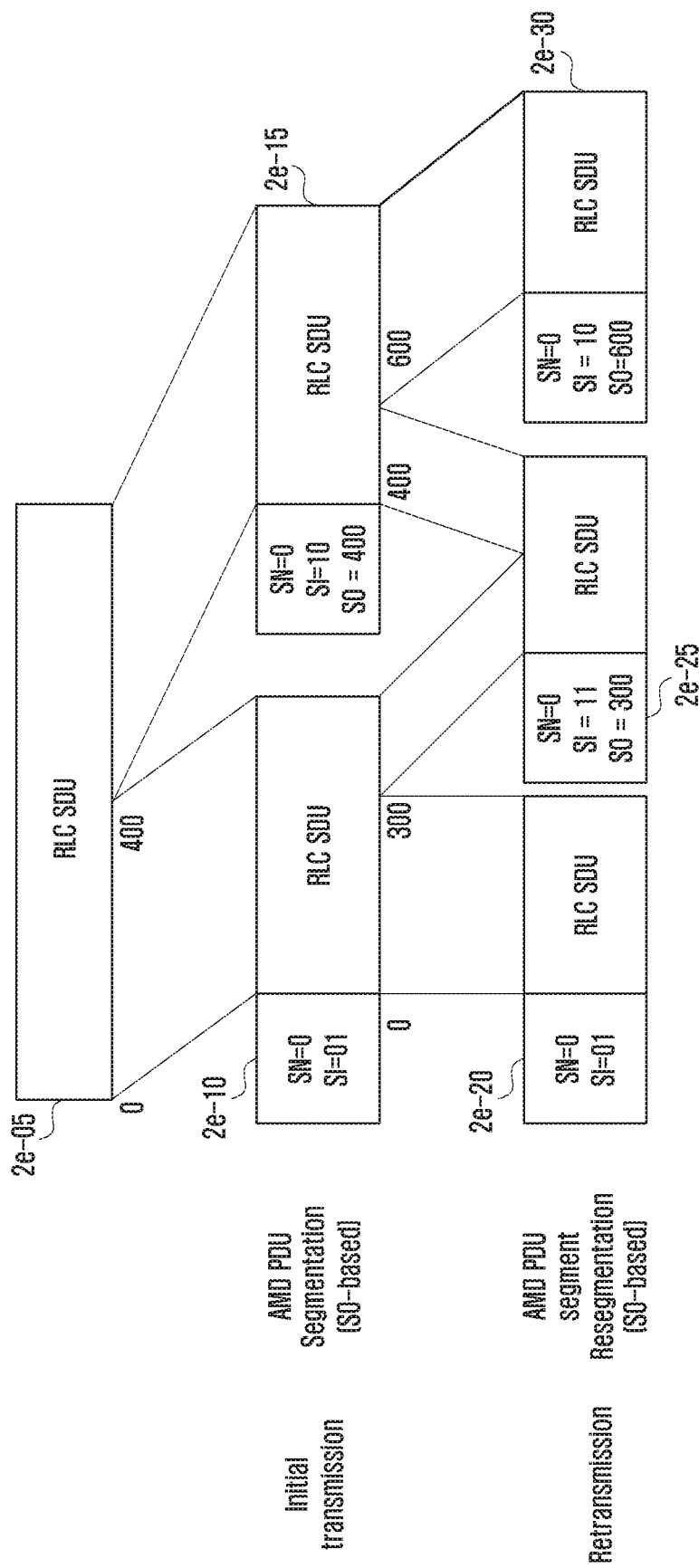
FIG. 2E is a diagram illustrating a segmentation operation which may be applied in a radio link control (RLC) layer according to an embodiment of the disclosure.

FIG. 2E is a diagram illustrating a segmentation operation which may be applied in an RLC layer according to an embodiment of the disclosure.

Referring to FIG. 2E, in one embodiment of the disclosure, a procedure and method of performing a segmentation operation based on a segment offset (SO) on a packet received from a higher layer may be applied in the RLC layer. The proposed method may include performing an integrated segmentation operation regardless of whether the segmentation operation is performed on a case where transmission is first performed and a case where retransmission is performed. Furthermore, in the proposed method, concatenation may not be performed in the RLC layer. Furthermore, an SI field may be introduced into an RLC header in order to identify whether an RLC SDU, that is, a data part posterior to an RLC header is a complete RLC SDU that has not been segmented, the foremost RLC SDU segment that has been segmented, a middle RLC SDU segment that has been segmented, or the last RLC SDU segment that has been segmented. Furthermore, a Length field indicative of the length may not be present in the RLC header.

In FIG. 2E, an RLC layer receives a PDCP PDU 2e-05 from the PDCP layer, that is, a higher layer. An RLC SDU may be processed in a size indicated by the MAC layer. If the RLC SDU is segmented, it is configured to include information on the segmentation of a header, and may form an RLC PDU. The RLC PDU includes an RLC header and an RLC payload (RLC SDU). The RLC header may include the property (e.g., data or control information) and segmentation information of the RLC PDU, and may include a data/control D/C field, a P field, a segmentation information (SI) field, a sequence number (SN) field, and a segment offset (SO) field. In the RLC UM mode that does not supports ARQ, a P field is not present and may be substituted with a reserved field.

The D/C field is 1 bit and used to whether an RLC PDU is a control PDU or a data PDU.

TABLE 1

| Value | Description |
| --- | --- |
| 0 | Control PDU |
| 1 | Data PDU |

The SN field indicates the serial number of an RLC PDU and may have a given length. For example, the SN field may have a length of 12 bits or 18 bits.

The SO field indicates that an RLC SDU segment has been first segmented at which location of the RLC SDU, and is used to indicate the first byte of a segmented segment.

The P field is set 1 when a condition in which a transmission stage triggers polling occurs so that a reception stage performs an RLC status report. For example, acknowledgement (ACK)/negative acknowledgment (NACK) information about RLC PDUs received so far may be transmitted to the transmission stage.

When the RLC layer receives the RLC SDU of 2e-05, it may directly insert an RLC SN into the RLC SDU, may generate an RLC header, and may generate an RLC PDU. If a segmentation operation is necessary for a given cause, the RLC layer may update an SI field as in 2e-10 or 2e-15 and generate an RLC PDU by adding an SO field to the RLC header. For example, after the segmentation operation, the SO field may be added to a segmented segment based on a given condition or may not be added. The given condition is determined based on the SI field to be described below. The given cause of which the segmentation operation is necessary may correspond to a case where the segmentation operation has been requested from the RLC layer with respect to a given MAC SDU (RLC PDU) because the size of a generated MAC sub-header and MAC SDU is greater than the size of a transmission resource allocated by the MAC layer. The SN field is the serial number of an RLC PDU, and a PDCP SN may be reused as the SN field if the packet data physical channel (PDCH) field is necessary or configured. The SO field is a field having a given length, and may indicate that the first byte of an RLC PDU data field (RLC SDU) segmented when transmission is first performed corresponds to any one of the bytes of the original RLC PDU data field (RLC SDU). The first byte of an RLC PDU data field re-segmented when retransmission is performed may also indicate any one of the bytes of the original RLC PDU data field (RLC SDU). The length of the SO field may be set by an RRC message (e.g., RRCConnectionSetup in operation 2d-10 or RRCConnectionReconfiguration message in operations 2d-40, 2d-75). The SI field may be defined as follows or may be called another name.

TABLE 2

| Value | Description |
|---|---|
| 00 | A complete RLC PDU |
| 01 | First segment of RLC PDU |
| 10 | Last segment of RLC PDU |
| 11 | Middle segment of RLC PDU |

When the SI field is 00, it indicates a complete RLC PDU that has not been segmented. In this case, the SO field is not necessary in the RLC header. When the SI field is 01, it indicates the foremost RLC PDU segment that has been segmented. In this case, the SO field is not necessary in the RLC header. The reason for this is that in the first segment, the SO field always indicates 0. When the SI field is 10, it indicates the last RLC PDU segment that has been segmented. In this case, the SO field is necessary in the RLC header. When the SI field is 11, it indicates a middle RLC PDU segment that has been segmented. In this case, the SO field is necessary in the RLC header. The mapping relation between the 2 bits and the four types of information (i.e., the complete RLC PDU, the foremost segment, the last segment, and the middle segment) may have a total of 4×3×2×1=24 types. The above example is only one example of the 24 types. An embodiment of the disclosure includes all the 24 types of mapping relations. If the transmission of the RLC PDUs of 2e-10 and 2e-15 fails, the RLC PDUs may be retransmitted. In this case, if a transmission resource is insufficient, the RLC PDUs may be re-segmented like 2e-20, 2e-25, and 2e-30. When the re-segmentation is performed, the SI field and SO field of the newly generated RLC PDUs 2e-20, 2e-25, and 2e-30 may be updated. Since 2e-20 is the foremost segment, an SI is updated with 01, and there is no need for an SO field.

Since 2e-25 is the middle segment, an SI is updated with 11, and an SO field is updated with 300 so that the first byte of an RLC PDU data field (RLC SDU) indicates any one of the bytes of the original RLC PDU data field (RLC SDU). Since 2e-30 is the last segment, an SI is updated with 10, and an SO field is updated with 600 so that the first byte of an RLC PDU data field (RLC SDU) indicates any one of the bytes of the original RLC PDU data field (RLC SDU).

The RLC layer may operate in an RLC acknowledged mode (AM), an RLC unacknowledged mode (UM), and an RLC transparent mode (TM). In the RLC AM mode, the RLC layer supports an ARQ function, and a transmission stage may receive an RLC status report from a reception stage and perform retransmission on RLC PDUs for which NACK has been received through the status report. Accordingly, reliable transmission of data not having an error is guaranteed. Accordingly, the RLC AM mode is suitable for a service that requires high reliability. In contrast, the RLC UM mode does not support the ARQ function. Accordingly, an RLC status report is not received, and there is no retransmission function. In the RLC UM mode, when an UL transmission resource is received, the RLC layer of a transmission stage functions to continue to transmit contiguous PDCP PDUs (RLC SDUs), received from a higher layer, to a lower layer. Accordingly, continuous data transfer is possible without transmission delay, and the RLC UM mode may be useful in a service sensitive to transmission delay. In the RLC TM mode, the RLC layer directly transmits PDCP PDUs, received from a higher layer, to a lower layer without performing any processing on the PDCP PDUs. For example, in the TM mode of the RLC layer, data from a higher layer is transparently transferred from the RLC layer to a lower layer. Accordingly, the TM mode may be usefully used to transmit system information or a paging message transmitted through a shared channel, such as a common control channel (CCCH).

An embodiment of the disclosure proposes an RLC layer operation in the RLC UM mode. For example, there are proposed a header structure applicable in the RLC UM mode and an efficient transmission stage and reception stage operation.

Figure 2F:
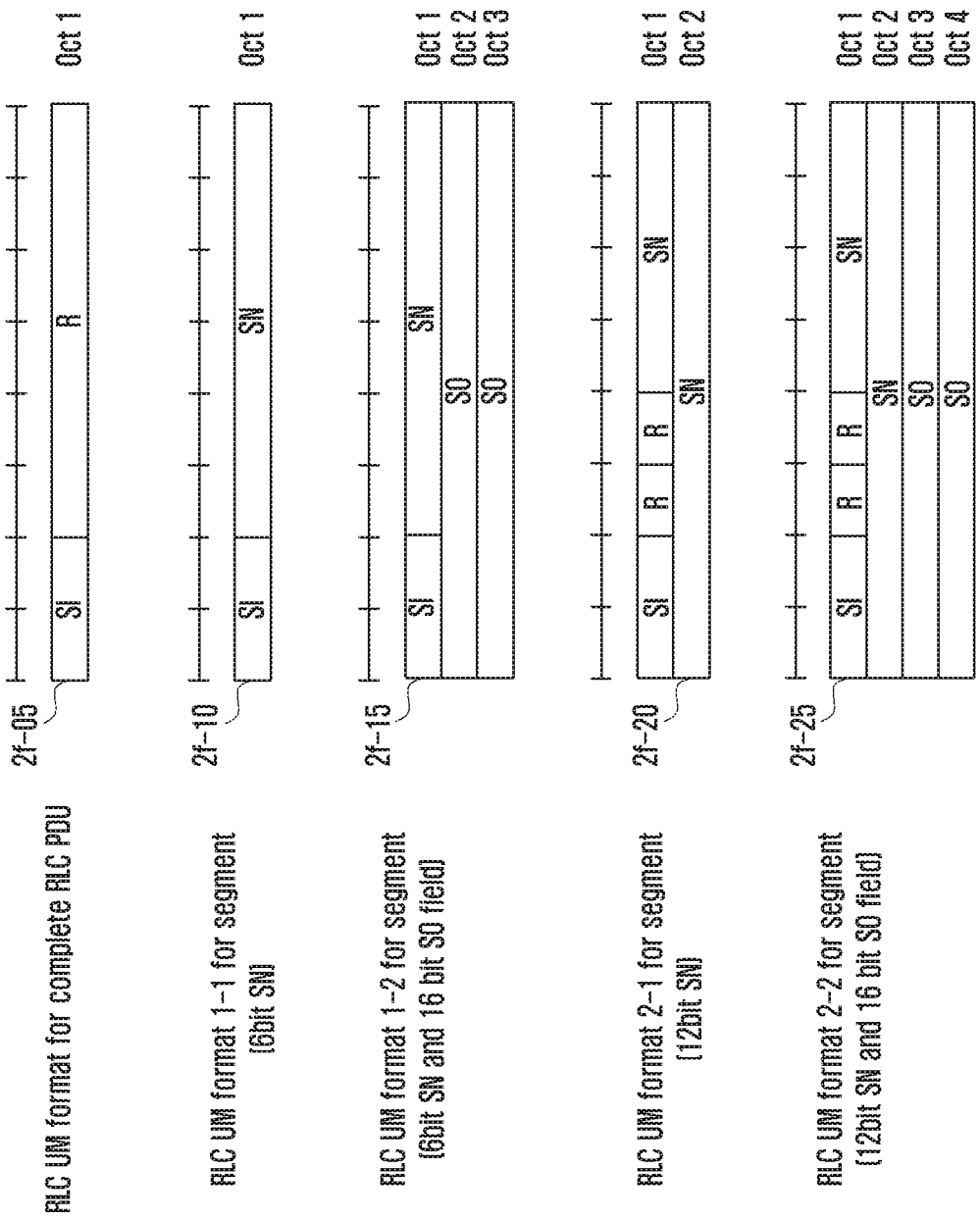
FIG. 2F illustrates a structure of an RLC header which may be applied in an RLC unacknowledged mode (UM mode) according to an embodiment of the disclosure.

FIG. 2F illustrates a structure of an RLC header which may be applied in an RLC UM mode according to an embodiment of the disclosure.

Referring to FIG. 2F, a structure of an RLC header is illustrated when the serial number of a 6-bit or 12 bit-length is used in the SO field and SI field-based segmentation operation described with reference to FIG. 2E if the RLC UM mode (if ARQ is not supported) according to an embodiment of the disclosure is used.

The structure of the RLC header may include some of the fields described with reference to FIG. 2E or another new field, and may have a different structure depending on a different RLC serial number length, the length of each field, such as the length of the SO field, and the location of each field. R refers to reserved bits. The structure of the RLC header may not include an RF field and an FI field or an E field. Furthermore, the RLC header may use an integrated header regardless of an RLC header when transmission is first performed and when retransmission is performed. As described with reference to FIG. 2E, the SI field functions to indicate a complete RLC SDU (or complete RLC PDU) on which a segmentation operation has not been performed and the first segment, a middle segment and the last segment on which a segmentation operation has been performed. As described with reference to FIG. 2E, an SO field is not necessary for a complete RLC SDU on which a segmentation operation has not been performed and the first segment on which a segmentation operation has been performed. Accordingly, the RLC header may have the format of 2f-10 (when the RLC serial number of a 6-bit length is used) or 2f-20 (when the RLC serial number of a 12-bit length is used). In contrast, an offset needs to be indicated in the SO fields of a middle segment and the last segments on which a segmentation operation has been performed. The RLC header may have the same RLC header format as 2f-15 (when the RLC serial number of a 6-bit length is used) or 2f-25 (when the RLC serial number of a 12-bit length is used).

An RLC serial number is not necessary for the complete RLC PDU (i.e., an RLC PDU on which a segmentation operation has not been performed). There are multiple cases where the RLC serial number is necessary. For example, the RLC serial number is necessary for reordering, redundancy check, lost packet detection and ARQ function support, and a segmented segment reassembly. However, in the new mobile communication system, reordering does not need to be performed in the RLC layer, redundancy check may be instead performed in the PDCP layer, and the lost packet detection and ARQ function is not supported in the RLC UM mode. Accordingly, the RLC serial number is necessary for only a segmented RLC PDU segment. Accordingly, the RLC serial number may not be necessary for a complete RLC PDU.

One embodiment of the disclosure proposes a method of using the same header format as 2f-05 without using an RLC serial number in a complete RLC PDU (If whether an RLC SN or an RLC header is present is indicated by a 1-bit indicator in the MAC sub-header of the MAC layer, the RLC header itself may be omitted without using the same header format as 2g-05 with respect to a complete RLC PDU. A reception stage may identify the indicator of the MAC sub-header and may be aware that an RLC header is not present and whether a corresponding PDU is a complete RLC PDU). For example, the transmission stage may indicate that an RLC PDU on which a segmentation operation has not been performed is a complete RLC PDU by indicating the SI field of the header of 2f-05 as 00 with respect to the RLC PDU in order to indicate that there is no RLC serial number. The reception stage may check the SI field of the header and may be aware that an RLC serial number is not present if the SI field is 00. Accordingly, it is not related to the length of an RLC serial number. A 1-byte header, such as 2f-05, may be used in a complete RLC PDU. Furthermore, in the case of the first RLC PDU segment on which a segmentation operation has been performed, the RLC header may be used as the format of 2f-10 (when the RLC serial number of a 6-bit length is used) or 2f-20 (when the RLC serial number of a 12-bit length is used) because an SO field is not necessary as described above. However, the same RLC header format as 2f-15 (when the RLC serial number of a 6-bit length is used) or 2f-25 (when the RLC serial number of a 12-bit length is used) may be used because an offset needs to be indicated in the SO fields of a middle segment and the last segment on which a segmentation operation has been performed. As described above, an RLC serial number is necessary for segments on which a segmentation operation has been performed. The reason for this is that what segments correspond to which RLC serial numbers may be identified using only the RLC serial numbers. A reception stage may generate a complete RLC PDU by performing reassembly based on the relation, may perform data processing, and may transmit an RLC SDU to a higher layer.

Whether the RLC serial number will be used in the complete RLC PDU may be configured for each bearer or logical channel as in FIG. 2D through the RRC message in operations 2d-10, 2d-40, 2d-75.

A first embodiment of the disclosure, in which a serial number is not used in the RLC UM mode is as follows.

For example, if an RLC serial number is configured to be not used, a transmission stage may attach the same 1-byte RLC header as 2f-05 not having an RLC serial number to an RLC SDU on which a segmentation operation has not been performed (performs an operation of setting an SI field to 00 when configuring an RLC header and configuring an RLC header to which an SO field has not been added), and may perform transmission by transmitting the RLC SDU to a lower layer. However, if an RLC serial number has been configured to be not used so as to reduce overhead, the transmission stage has to add an RLC serial number to an RLC SDU on which a segmentation operation has been performed and to use an SI field and SO field, such as those described with reference to FIG. 2E. The reason why the RLC header is configured by applying the RLC serial number, the SI field, and the SO field to the segmented RLC SDU is that a reception stage can receive segmented RLC SDU segments and reconstruct a complete RLC SDU by reassembling the RLC SDU segments. Accordingly, although the RLC serial number is configured to be not used in the RLC UM mode, if a segmentation operation has been performed, the same RLC header as 2f-10, 2f-15, 2f-20 or 2f-25 needs to be applied. For example, the first segment may use the format, such as 2f-10 or 2f-20, and a middle segment and the last segment may use the 2f-15 or 2f-25 format.

In summary, the transmission stage attaches the same 1-byte RLC header as 2f-05 not having an RLC serial number to an RLC SDU on which a segmentation operation has not been performed based on whether a segmentation operation has been performed on the RLC SDU, and transmits the RLC SDU to a lower layer. Furthermore, the transmission stage updates a corresponding SI field depending on the type (the first, a middle and the last) of a segment segmented as described above with respect to an RLC SDU on which a segmentation operation has been performed, configures an RLC header by adding an SO field to the RLC SDU if the type of the segment is the middle and last segments, and transmits the RLC SDU to a lower layer.

The reception stage receives an RLC SDU, identifies an SI field in the RLC header of the RLC SDU, and determines whether the received RLC SDU is an RLC SDU (i.e., complete RLC SDU) on which a segmentation operation has not been performed or whether the received RLC SDU is an RLC SDU (i.e., segment) on which a segmentation operation has been performed. If the received RLC SDU is an RLC SDU on which a segmentation operation has not been performed, the reception stage may delete the RLC header and upload the RLC SDU to a higher layer. If the received RLC SDU is an RLC SDU on which a segmentation operation has been performed, the reception stage checks an SI field, determines that the checked SI field corresponds to any one of the first, middle and last segments, reorders RLC serial numbers by taking the SO field into consideration, generates a complete RLC SDU through reassembly when a reassembly function is triggered by a window or timer, transmits the complete RLC SDU to a higher layer, and discards the received RLC SDU if the reassembly is impossible.

The reception stage in the RLC UM mode may operate based on a window or may operate based on a timer.

In one embodiment of the disclosure, the (1-1) embodiment of an operation of the reception stage in the RLC UM mode is as follows. The (1-1) embodiment is an operation of the reception stage driven based on a window.

When the reception stage in the RLC UM mode operates based on the window, it operates an RLC reception window, and the window may operate in a size half the RLC serial number. The lower edge of the window may be set as a serial number obtained by subtracting the size of an RLC window from an upper edge. The upper edge may be set as the highest RLC serial number received from a reception stage RLC. Accordingly, if the received RLC serial number has a higher value than the RLC serial numbers within the window, the window moves based on the value. If the serial number of the received RLC PDU has a value greater than the received window upper edge, the window moves forward. In contrast, if the serial number of the received RLC PDU has a value smaller than the received window lower edge, the RLC layer of the reception stage may discard the received RLC PDU, may check whether a redundant RLC PDU is received with respect to the RLC serial number within the window, and may discard the redundant RLC PDU. Furthermore, if an RLC PDU segment having an RLC serial number within the window arrives, the reception stage may perform an operation of storing the RLC PDU segment, generating a complete RLC PDU by performing a reassembly procedure when the lower edge of the window passes through an RLC serial number corresponding to the RLC PDU segment, transmitting the complete RLC PDU to a higher layer, and discarding RLC PDU segments if a complete RLC PDU is not generated. Furthermore, the RLC layer of the reception stage performs a procedure of identifying an SI field, directly uploading the RLC PDU to a higher layer if the RLC PDU is an RLC PDU on which a segmentation operation has not been performed, storing the RLC PDU when an SI field indicates the RLC PDU on which a segmentation operation has been performed, performing a reassembly procedure when the reassembly procedure is triggered (i.e., a lower edge moves to a value greater than the RLC serial number of segments) by a window as described above, and uploading the RLC PDU to a higher layer or discarding the RLC PDU.

In one embodiment of the disclosure, the (1-2) embodiment of an operation of the reception stage in the RLC UM mode is as follows. The (1-2) embodiment is an operation of the reception stage driven based on a window and a timer.

When the reception stage in the RLC UM mode operates based on the window, it operates an RLC reception window, and the window may operate in a size half the RLC serial number. The lower edge of the window may be set as a serial number obtained by subtracting the size of an RLC window from an upper edge. The upper edge may be set as the highest RLC serial number received from a reception stage RLC. Accordingly, if the received RLC serial number has a higher value than the RLC serial numbers within the window, the window moves based on the value. If the serial number of the received RLC PDU has a value greater than the received window upper edge, the window moves forward. In contrast, if the serial number of the received RLC PDU has a value smaller than the received window lower edge, the RLC layer of the reception stage may discard the received RLC PDU, may check whether a redundant RLC PDU is received with respect to the RLC serial number within the window, and may discard the redundant RLC PDU.

One timer may operate within the window. The time when the timer is driven may be one or more of the followings.

1. When (the timer is not now driven and) a lost packet is detected through a window operation, that is, when a gap is checked between RLC serial numbers, 2. When (the timer is not now driven and) a given segment arrives at a received RLC UM PDU, 3. When (the timer is not now driven and) a given segment arrives at a received RLC UM PDU within one RLC serial number, 4. When (the timer is not now driven and) segments are not sequentially received in a received RLC UM PDU within one RLC serial number and the loss of a segment is detected or a gap is checked between segments within one RLC serial number, 5. When (the timer is not now driven and) the second segment or a subsequent segment are arrived, but cannot form a complete RLC PDU other than a case where the first segment is arrived at a received RLC UM PDU within one RLC serial number (to drive a timer may not be preferred because the second segment has not been transmitted by a transmission stage), and 6. When (the timer is not now driven and) a segment other than the first segment arrives at a received RLC UM PDU within one RLC serial number.

If the timer triggering condition has been satisfied, but the timer is already driven, a corresponding segment has only to be stored in the buffer (if segments having correct order (or lost segment) have been arrived, but a complete RLC PDU may not be reassembled, the timer may be updated and restarted.)

When an RLC PDU segment having an RLC serial number within a window is arrived, the reception stage stores the RLC PDU segment. If the lower edge of the window passes through an RLC serial number corresponding to the RLC PDU segment or a set timer expires, the RLC layer of the reception stage may perform an operation of generating a complete RLC PDU by performing a reassembly procedure, transmitting the complete RLC PDU to a higher layer, and discarding RLC PDU segments if a complete RLC PDU is not generated. Furthermore, the RLC layer of the reception stage performs a procedure of identifying an SI field, directly transmitting the RLC PDU to a higher layer if the RLC PDU is an RLC PDU on which a segmentation operation has not been performed, storing the RLC PDU if the SI field indicates an RLC PDU on which a segmentation operation has been performed, performing a reassembly procedure when the reassembly procedure is triggered (if a lower edge moves to a value greater than the RLC serial number of segments) by a window or timer as described above, and uploading the RLC PDU to a higher layer or discarding the RLC PDU.

When the reception stage in the RLC UM mode operates based on the timer, the RLC layer of the reception stage in the RLC UM mode drives the timer. Multiple timers may be driven or a single time may be driven.

In one embodiment of the disclosure, the (1-3) embodiment of operations of a transmission stage and a reception stage in the RLC UM mode is as follows. The (1-3) embodiment corresponds to the operations of the transmission stage and the reception stage driven based on one timer (i.e., reassembly timer).

When only one timer is driven, the transmission stage and the reception stage configure an entity for the RLC UM mode. Furthermore, the RLC UM mode device of the transmission stage may manage a variable called "VT(S)" (it may be reused as a different variable or may be called a different name). The variable called "VT(S)" is an RLC serial number value assigned to segments on which a segmentation operation has been performed in the transmission stage. Segmented segments have the same RLC serial number, that is, the same VT(S), with respect to one RLC PDU. The reception stage may set a timer and timer value configured by an ENB. The VT(S) value may be initially set to 0.

When data occurs in the RLC UM mode, the transmission stage may configure an RLC UM PDU and may also previously configure a MAC SDU and a MAC sub-header. Thereafter, when a transmission resource is identified or received, the transmission stage determines whether to segment and transmit RLC UM PDUs based on the size of the transmission resource. In the case of a complete RLC PDU on which segmentation transmission is not performed, the transmission stage configures a 1-byte RLC header not including an RLC serial number (1g-05), and maintains a VT(S) value. For example, the transmission stage does not assign an RLC serial number. If it is determined that segmentation transmission is to be performed on any RLC PDU, the transmission stage configures a header including an RLC serial number (e.g., the first segment forms a header not having the same SO field as 2f-10 or 2f-20, and the remaining segments form a header having the same SO field as 2f-15 or 2f-25). When the segmentation transmission is performed, if a segment on which the segmentation transmission will be performed is not the last segment, the transmission stage maintains a VT(S) value (because the same RLC serial number value or VT(S) value has to be assigned to segments to be subsequently transmitted). However, if a segment on which the segmentation transmission will be performed is the last segment, the transmission stage assigns a VT(S) value and increases the VT(S) value by 1 (an RLC serial number for a next RLC PDU on which a segmentation operation is performed is previously set).

The reception stage receives the RLC UM PDU. The RLC layer of the reception stage may identify an SI field, may perform RLC layer data processing if the RLC UM PDU is the same as an RLC PDU on which a segmentation operation has not been performed (header is removed), may directly upload the RLC UM PDU to a higher layer, may identify an SI field, may store the RLC PDU if the SI field indicates an RLC PDU on which a segmentation operation has been performed, and may drive a timer. If a single complete RLC PDU can be configured by reassembling a received segment and segments stored in the buffer, the RLC layer of the reception stage may perform RLC layer data processing (header is removed) and directly upload the complete RLC PDU to a higher layer. If a single complete RLC PDU cannot be configured by reassembling the received segment and the segments stored in the buffer, the RLC layer of the reception stage may store the RLC PDU in the buffer, may identify a subsequently received RLC PDU, and may store it until reassembly is attempted. The time when the timer is driven may be one or more of the followings.

1. When (the timer is not now driven and) a lost packet is detected,
2. When (the timer is not now driven and) a given segment arrives at a received RLC UM PDU,
3. When (the timer is not now driven and) a given segment arrives at a received RLC UM PDU within one RLC serial number,
4. When (the timer is not now driven and) segments are not sequentially received in a received RLC UM PDU within one RLC serial number and the loss of a segment is detected or a gap is checked between segments within one RLC serial number,
5. When (the timer is not now driven and) the second segment or a subsequent segment are arrived, but cannot form a complete RLC PDU other than a case where the first segment is arrived at a received RLC UM PDU within one RLC serial number (to drive a timer may not be preferred because the second segment has not been transmitted by a transmission stage), and
6. When (the timer is not now driven and) a segment other than the first segment arrives at a received RLC UM PDU within one RLC serial number.

If the timer triggering condition has been satisfied, but the timer is already driven, a corresponding segment has only to be stored in the buffer (if segments having correct order (or lost segment) have been arrived, but a complete RLC PDU may not be reassembled, the timer may be updated and restarted.)

When the time expires, the reception stage discards segments corresponding to all of RLC serial numbers related to the timer or all of segments related to the timers from the buffer. Alternatively, when the timer expires, the reception stage attempts reassembly on segments corresponding to all of RLC serial numbers related to the timer or all of segments related to the timers, and discards all of them from the buffer if a complete RLC PDU cannot be configured.

In both the case where the timer is not driven and the case where the timer is being driven, if a received RLC PDU is a segment, the reception stage may always attempt reassembly between the segment and the segments of a corresponding RLC serial number stored in the buffer. If a complete RLC PDU can be configured by reassembling the segments, the reception stage may directly transmit the completed RLC PDU to a higher layer.

Whenever RLC UM PDUs are received, the reception stage repeats the process. When an RLC PDU segment is arrived, the RLC layer of the reception stage checks whether the timer is being driven based on a triggering condition and restarts the timer if the timer has not been driven.

In one embodiment of the disclosure, the (1-4) embodiment of operations of a transmission stage and reception stage in the RLC UM mode is as follows. The (1-4) embodiment corresponds to the operations of the transmission stage and the reception stage performed based on a plurality of timers (i.e., reassembly timers).

If a plurality of timers is driven, the timers may be driven for each RLC serial number.

The transmission stage and the reception stage configure an entity for the RLC UM mode. Furthermore, the RLC UM mode device of the transmission stage may manage a variable called "VT(S)" (it may be reused as a different variable or may be called a different name). The variable called "VT(S)" is an RLC serial number value assigned to segments on which a segmentation operation has been performed in the transmission stage, and segments segmented with respect to one RLC PDU have the same RLC serial number, that is, the same VT(S). The reception stage may set a timer and timer value configured by an ENB. The VT(S) value may be initially set to 0.

When data occurs in the RLC UM mode, the transmission stage may configure an RLC UM PDU and may also previously configure a MAC SDU and a MAC sub-header. Thereafter, when a transmission resource is identified or received, the transmission stage determines whether to segment and transmit RLC UM PDUs based on the size of the transmission resource. In the case of a complete RLC PDU on which segmentation transmission is not performed, the transmission stage configures a 1-byte RLC header not including an RLC serial number (1g-05), and maintains a VT(S) value. For example, the transmission stage does not assign an RLC serial number. If it is determined that segmentation transmission is to be performed on any RLC PDU, the transmission stage configures a header including an RLC serial number (e.g., the first segment forms a header not having the same SO field as 2f-10 or 2f-20, and the remaining segments form a header having the same SO field as 2f-15 or 2f-25). When the segmentation transmission is performed, if a segment on which the segmentation transmission will be performed is not the last segment, the transmission stage maintains a VT(S) value (because the same RLC serial number value or VT(S) value has to be assigned to segments to be subsequently transmitted). However, if a segment on which the segmentation transmission will be performed is the last segment, the transmission stage assigns a VT(S) value and increases the VT(S) value by 1 (an RLC serial number for a next RLC PDU on which a segmentation operation is performed is previously set).

The reception stage receives the RLC UM PDU. The RLC layer of the reception stage may identify an SI field, may perform RLC layer data processing if the RLC UM PDU is the same as an RLC PDU on which a segmentation operation has not been performed (header is removed), may directly upload the RLC UM PDU to a higher layer, may identify an SI field, may store the RLC PDU if the SI field indicates an RLC PDU on which a segmentation operation has been performed, and may drive a timer. If a single complete RLC PDU can be configured by reassembling a received segment and segments stored in the buffer, the RLC layer of the reception stage may perform RLC layer data processing (header is removed) and directly upload the complete RLC PDU to a higher layer. If a single complete RLC PDU cannot be configured by reassembling the received segment and the segments stored in the buffer, the RLC layer of the reception stage may store the RLC PDU in the buffer, may identify a subsequently received RLC PDU, and may store it until reassembly is attempted. The timers may be individually driven one by one for each RLC serial number. For example, when segments corresponding to different RLC serial numbers are sequentially received, timers corresponding to the respective RLC serial numbers may be driven. The time when the timer is driven may be one or more of the followings.

1. When (the timer is not now driven with respect to a corresponding RLC serial number and) a lost packet is detected, 2. When (the timer is not now driven with respect to a corresponding RLC serial number and) a given segment arrives at a received RLC UM PDU, 3. When (the timer is not now driven with respect to a corresponding RLC serial number and) a given segment arrives at a received RLC UM PDU within one RLC serial number, 4. When (the timer is not now driven with respect to a corresponding RLC serial number and) segments are not sequentially received in a received RLC UM PDU within one RLC serial number and the loss of a segment is detected or a gap is checked between segments within one RLC serial number.

5. When (the timer is not now driven with respect to a corresponding RLC serial number and) the second segment or a subsequent segment are arrived, but cannot form a complete RLC PDU other than a case where the first segment is arrived at a received RLC UM PDU within one RLC serial number (to drive a timer may not be preferred because the second segment has not been transmitted by a transmission stage).

6. When (the timer is not now driven with respect to a corresponding RLC serial number and) a segment other than the first segment arrives at a received RLC UM PDU within one RLC serial number.

If the timer triggering condition has been satisfied, but the timer is being driven with respect to a corresponding RLC serial number, a corresponding segment has only to be stored in the buffer (if segments having correct order (or lost segment) have been arrived, but a complete RLC PDU may not be reassembled, the timer may be updated and restarted).

When each of timers expires, the reception stage discards segments corresponding to RLC serial numbers related to the respective timers or all of segments related to the timers from the buffer. Alternatively, when each of the times expires, the reception stage attempt reassembly on the segments corresponding to the RLC serial numbers related to the respective timers or all of the segments related to the timers, and discards all the segments from the buffer if a complete RLC PDU cannot be configured.

In both the case where the timer is not driven and the case where the timer is being driven, if a received RLC PDU is a segment, the reception stage may always attempt reassembly between the segment and the segments of a corresponding RLC serial number stored in the buffer. If a complete RLC PDU can be configured by reassembling the segments, the reception stage may directly transmit the completed RLC PDU to a higher layer.

Whenever RLC UM PDUs are received, the reception stage repeats the process. When an RLC PDU segment is arrived, the RLC layer of the reception stage checks whether the timer is being driven based on a triggering condition and restarts the timer if the timer has not been driven.

FIG. 2G is a diagram illustrating a transmission operation of an RLC UM mode UE according to an embodiment of the disclosure.

Referring to FIG. 2G, when a request to perform a segmentation operation on an RLC SDU (or PDCP PDU) received from a higher layer is received from a lower layer in the RLC UM mode, a UE 2g-01 may perform the segmentation operation. Furthermore, in the case of an RLC PDU transmitted to a lower layer after an RLC header has already been configured, when a segmentation request is received from the lower layer, the UE may perform a segmentation operation, may newly configure or update an RLC header, and may transmit it to the lower layer. When configuring the RLC header for the RLC SDU, the UE first checks whether it is necessary to perform the segmentation operation in operation 2g-05.

If a first condition is satisfied, the UE performs a first operation in operation 2g-10, If a second condition is satisfied, the UE performs a second operation in operation 2g-15, If a third condition is satisfied, the UE performs a third operation in operation 2g-20, and If a fourth condition is satisfied, the UE performs a fourth operation in operation 2g-25.

The first condition is a case where a segmentation operation for an RLC SDU is not necessary, and refers to a case where a segmentation operation is not performed.

The second condition refers to a case where after a segmentation operation is performed, an RLC header needs to be configured with respect to a first RLC SDU segment because the segmentation operation for an RLC SDU is necessary.

The third condition refers to a case where after a segmentation operation is performed, an RLC header needs to be configured with respect to a middle RLC SDU segment other than the first segment and the last segment because the segmentation operation for an RLC SDU is necessary.

The fourth condition refers to a case where after a segmentation operation is performed, an RLC header needs to be configured with respect to the last RLC SDU segment because the segmentation operation is necessary with respect to an RLC SDU.

The first operation refers to an operation for the UE to not use an RLC serial number, to configure a 1-byte RLC header, and to set an SI field to 00 when configuring the 1-byte RLC header. Furthermore, the UE maintains a current VT(S) value.

The second operation refers to an operation for the UE to set an SI field to 01 when configuring an RLC header, to configure the RLC header to which an SO field has not been added, and to assign a current VT(S) value as an RLC serial number. Furthermore, the UE maintains a current VT(S) value.

The third operation refers to an operation for the UE to set an SI field to 11 when configuring an RLC header, to configure the RLC header so that an offset may be indicated by adding an SO field, and to assign a current VT(S) value as an RLC serial number. Furthermore, the UE maintains a current VT(S) value.

The fourth operation refers to an operation for the UE to set an SI field to 10 when configuring an RLC header, to configure the RLC header so that an offset may be indicated by adding an SO field, and to assign a current VT(S) value as an RLC serial number. Furthermore, the UE increases the current VT(S) value by 1 and stores the increased VT(S) value as a new VT(S) value. An RLC serial number is previously assigned for the segment of an RLC PDU to be subsequently segmented.

Figure 2H:
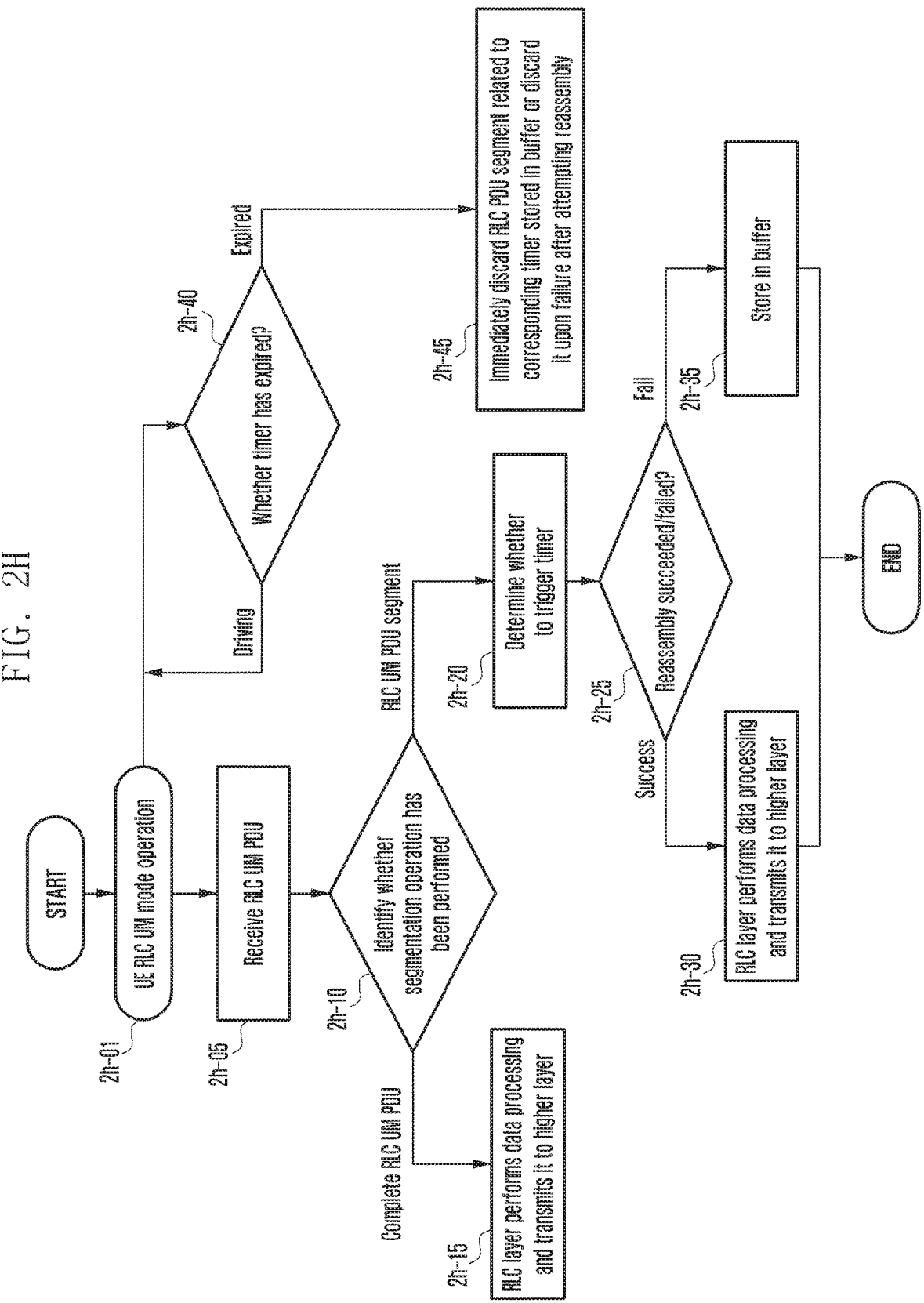
FIG. 2H is a diagram illustrating a reception operation of an RLC UM mode UE according to the (1-3) embodiment and (1-4) embodiment of the disclosure.
Figure 21:
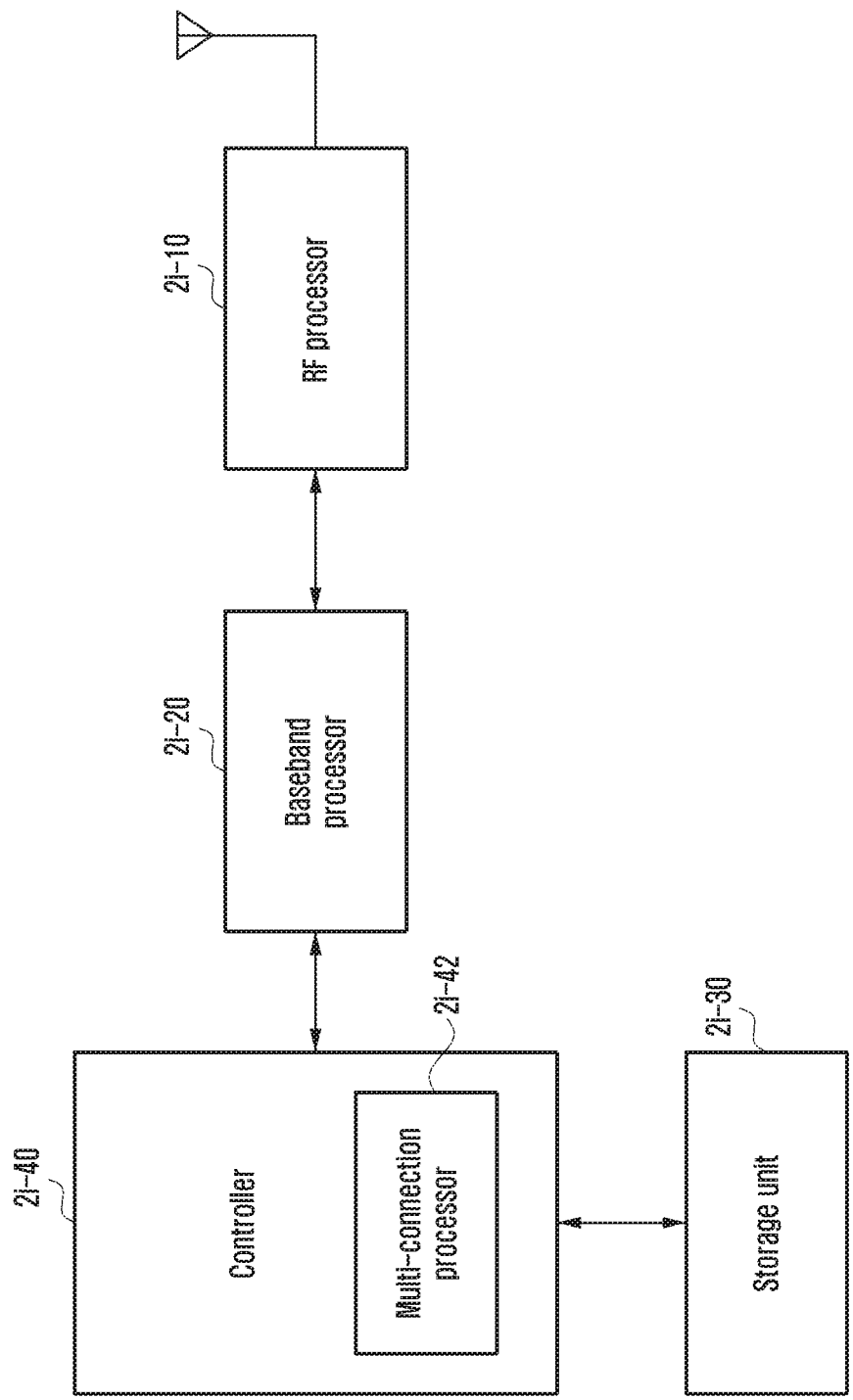

FIG. 2H is a diagram illustrating a reception operation of an RLC UM mode UE according to the (1-3) embodiment and (1-4) embodiment of the disclosure.

Referring to FIG. 2H, a UE, in operation 2h-01, may operate a reception stage operation based on one timer or a plurality of timers (i.e., reassembly timers). When a plurality of timers is driven, the timers may be driven for each RLC serial number.

The UE receives an RLC UM PDU in operation 2h-05. The RLC layer of the reception stage identifies an SI field in operation 2h-10. If the RLC UM PDU is an RLC PDU on which a segmentation operation has not been performed, the RLC layer performs RLC layer data processing (header is removed) and uploads the RLC UM PDU to a higher layer in operation 2h-15. If, as a result of the identification, the SI field indicates an RLC PDU on which a segmentation operation has been performed, the RLC layer may drive a timer in operation 2h-20. If it is determined in operation 2h-25 that one complete RLC PDU can be configured by reassembling a received segment and segments stored in the buffer, the RLC layer may perform RLC layer data processing (header is removed) and directly upload the complete RLC PDU to a higher layer in operation 2h-30. If it is determined in operation 2h-25 that one complete RLC PDU cannot be configured by reassembling a received segment and segments stored in the buffer, the RLC layer may store the RLC PDU in the buffer, may identify a subsequently received RLC PDU, and may store it until reassembly is attempted in operation 2h-35. If a plurality of timers is used, the timers may be individually driven one by one for each RLC serial number. For example, when segments corresponding to different RLC serial numbers are sequentially received, timers corresponding to the respective RLC serial numbers may be driven. The time when the timer is driven may be one or more of the followings.

1. When (the timer is not now driven with respect to a corresponding RLC serial number and) a lost packet is detected, 2. When (the timer is not now driven with respect to a corresponding RLC serial number and) a given segment arrives at a received RLC UM PDU, 3. When (the timer is not now driven with respect to a corresponding RLC serial number and) a given segment arrives at a received RLC UM PDU within one RLC serial number, 4. When (the timer is not now driven with respect to a corresponding RLC serial number and) segments are not sequentially received in a received RLC UM PDU within one RLC serial number and the loss of a segment is detected or a gap is checked between segments within one RLC serial number.

5. When (the timer is not now driven with respect to a corresponding RLC serial number and) the second segment or a subsequent segment are arrived, but cannot form a complete RLC PDU other than a case where the first segment is arrived at a received RLC UM PDU within one RLC serial number (to drive a timer may not be preferred because the second segment has not been transmitted by a transmission stage).

6. When (the timer is not now driven with respect to a corresponding RLC serial number and) a segment other than the first segment arrives at a received RLC UM PDU within one RLC serial number.

If the timer triggering condition has been satisfied, but the timer is being driven with respect to a corresponding RLC serial number, a corresponding segment has only to be stored in the buffer (if segments having correct order (or lost segment) have been arrived, but a complete RLC PDU may not be reassembled, the timer may be updated and restarted).

When it is determined in operation 2h-40 that each of the timers expires, the reception stage discards all of segments corresponding to RLC serial numbers related to the respective timers or all of segments related to the timers from the buffer. Alternatively, when each of the times expires, the reception stage attempts reassembly on the segments corresponding to the RLC serial numbers related to the respective timers or all of the segments related to the timers, and discards all the segments from the buffer if a complete RLC PDU cannot be configured in operation 2h-45.

In both the case where the timer is not driven and the case where the timer is being driven, if a received RLC PDU is a segment, the reception stage may always attempt reassembly between the segment and the segments of a corresponding RLC serial number stored in the buffer. If a complete RLC PDU can be configured by reassembling the segments, the reception stage may directly transmit the completed RLC PDU to a higher layer.

FIG. 2I illustrates a configuration of a UE to which an embodiment of the disclosure.

Referring to FIG. 2I, the UE includes a radio frequency (RF) processor 2i-10, a baseband processor 2i-20, a storage unit 2i-30, and a controller 2i-40.

The RF processor 2i-10 performs functions for transmitting/receiving a signal through a radio channel, such as the band conversion and amplification of a signal. For example, the RF processor 2i-10 up-converts a baseband signal received from the baseband processor 2i-20 into an RF band signal, transmits the RF band signal through an antenna, and down-converts an RF band signal received through the antenna into a baseband signal. For example, the RF processor 2i-10 may include a transmission filter, a reception filter, an amplifier, a mixer, an oscillator, a digital to analog convertor (DAC), and an analog to digital convertor (ADC). In FIG. 2I, only one antenna has been illustrated, but the UE may include multiple antennas. Furthermore, the RF processor 2i-10 may include multiple RF chains. Furthermore, the RF processor 2i-10 may perform beamforming. For the beamforming, the RF processor 2i-10 may adjust the phase and size of each of signals transmitted/received through multiple antennas or antenna elements. Furthermore, the RF processor may perform MIMO. When the MIMO operation is performed, the RF processor may receive multiple layers. The RF processor 2i-10 may properly configure multiple antenna or antenna elements under the control of the controller, and may perform received beam swiping or adjust the direction and beam width of the received beam so that the received beam cooperates with a transmitted beam.

The baseband processor 2i-20 performs a baseband signal and inter-bit stream conversion function based on the physical layer standard of a system. For example, when data is transmitted, the baseband processor 2i-20 generates complex symbols by coding and modulating a transmission bit stream. Furthermore, when data is received, the baseband processor 2i-20 reconstructs a reception bit stream from a baseband signal received from the RF processor 2i-10 through modulation and demodulation. For example, if an OFDM scheme is applied, when data is transmitted, the baseband processor 2i-20 generates complex symbols by coding and modulating a transmission bit stream, maps the complex symbols to subcarriers, and then configures OFDM symbols through inverse fast Fourier transform (IFFT) operation and cyclic prefix (CP) insertion. Furthermore, when data is received, the baseband processor 2i-20 segments a baseband signal received from the RF processor 2i-10 in an OFDM symbol unit, reconstructs signals mapped to subcarriers through fast Fourier transform (FFT) operation, and reconstructs a reception bit stream through modulation and demodulation.

The baseband processor 2i-20 and the RF processor 2i-10 transmit and receive signals as described above. Accordingly, the baseband processor 2i-20 and the RF processor 2i-10 may be called a transmitter, a receiver, a transceiver or a communication unit. Furthermore, at least one of the baseband processor 2i-20 and the RF processor 2i-10 may include multiple communication modules in order to support different multiple radio access technologies. Furthermore, at least one of the baseband processor 2i-20 and the RF processor 2i-10 may include different communication modules in order to process signals of different frequency bands. For example, the different radio access technologies may include an LTE network and an NR network. Furthermore, the different frequency bands may include a super high frequency (SHF) (e.g., 2.5 GHz, 5 GHz) band and a millimeter wave (e.g., 60 GHz) band.

The storage unit 2i-30 stores data, such as a basic program, an application program, and configuration information for the operation of the UE. The storage unit 2i-30 provides stored data in response to a request from the controller 2i-40.

The controller 2i-40 controls an overall operation of the UE. For example, the controller 2i-40 transmits/receives a signal through the baseband processor 2i-20 and the RF processor 2i-10. Furthermore, the controller 2i-40 writes data in the storage unit 2i-40 and reads data from the storage unit 2i-40. To this end, the controller 2i-40 may include at least one processor (e.g., a multi-connection processor 2i-42). For example, the controller 2i-40 may include a CP performing control for communication and an application processor (AP) controlling a higher layer, such as an application program.

Figure 2J:
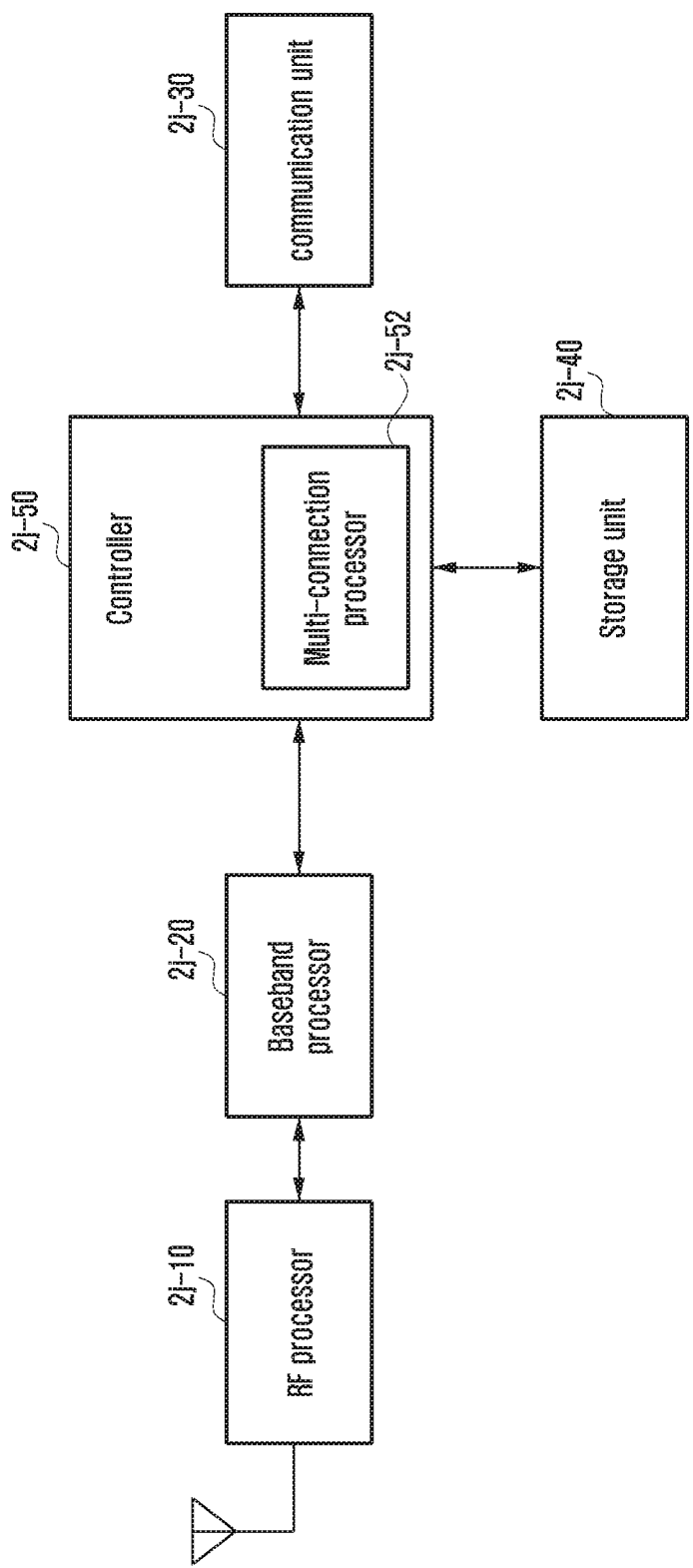
FIG. 2J illustrates a block configuration of a total radiated power (TRP) in a wireless communication system according to an embodiment of the disclosure.

FIG. 2J illustrates a block configuration of a TRP in a wireless communication system according to an embodiment of the disclosure may be applied.

Referring to FIG. 2J, the ENB includes an RF processor 2j-10, a baseband processor 2j-20, a backhaul communication unit 2j-30, a storage unit 2j-40, and a controller 2j-50.

The RF processor 2j-10 performs a function for transmitting/receiving a signal through a radio channel, such as the band conversion and amplification of a signal. For example, the RF processor 2j-10 up-converts a baseband signal received from the baseband processor 2j-20 into an RF band signal, transmits the RF band signal through an antenna, and down-converts an RF band signal received through the antenna into a baseband signal. For example, the RF processor 2j-10 may include a transmission filter, a reception filter, an amplifier, a mixer, an oscillator, a DAC, and an ADC. In FIG. 2J, only one antenna has been illustrated, but the ENB may include multiple antennas. Furthermore, the RF processor 2j-10 may include multiple RF chains. Furthermore, the RF processor 2j-10 may perform beamforming. For the beamforming, the RF processor 2j-10 may adjust the phase and size of each of signals transmitted/received multiple antennas or antenna elements. The RF processor may perform a downlink MIMO operation by transmitting one or more layers.

The baseband processor 2j-20 performs a baseband signal and inter-bit stream conversion function based on the physical layer standard of a first radio access technology. For example, when data is transmitted, the baseband processor 2j-20 generates complex symbols by coding and modulating a transmission bit stream. Furthermore, when data is received, the baseband processor 2j-20 reconstructs a reception bit stream from a baseband signal received from the RF processor 2j-10 through modulation and demodulation. For example, if the OFDM scheme is applied, when data is transmitted, the baseband processor 2j-20 generates complex symbols by coding and modulating a transmission bit stream, maps the complex symbols to subcarriers, and configures OFDM symbols through IFFT operation and CP insertion. Furthermore, when data is received, the baseband processor 2j-20 segments a baseband signal received from the RF processor 2j-10 in an OFDM symbol unit, reconstructs signals mapped to subcarriers through FFT operation, and then reconstructs a reception bit stream through modulation and demodulation. The baseband processor 2j-20 and the RF processor 2j-10 transmit and receive signals as described above. Accordingly, the baseband processor 2j-20 and the RF processor 2j-10 may be called a transmitter, a receiver, a transceiver, a communication unit or a wireless communication unit.

The communication unit 2j-30 provides an interface for performing communication with other nodes within a network.

The storage unit 2j-40 stores data, such as a basic program, an application program, and configuration information for the operation of the primary ENB. Specifically, the storage unit 2j-40 may store information on a bearer allocated to an accessed UE and measurement results reported by an accessed UE. Furthermore, the storage unit 2j-40 may store information, that is, a criterion by which whether to provide a UE with multiple connections is determined. Furthermore, the storage unit 2j-40 provides stored data in response to a request from the controller 2j-50.

The controller 2j-50 controls an overall operation of the primary ENB. For example, the controller 2j-50 transmits/receives a signal through the baseband processor 2j-20 and the RF processor 2j-10 or through the backhaul communication unit 2j-30. Furthermore, the controller 2j-50 writes data in the storage unit 2j-40 and reads data from the storage unit 2j-40. To this end, the controller 2j-50 may include at least one processor (e.g., a multi-connection processor 2i-52).

Figure 2K:
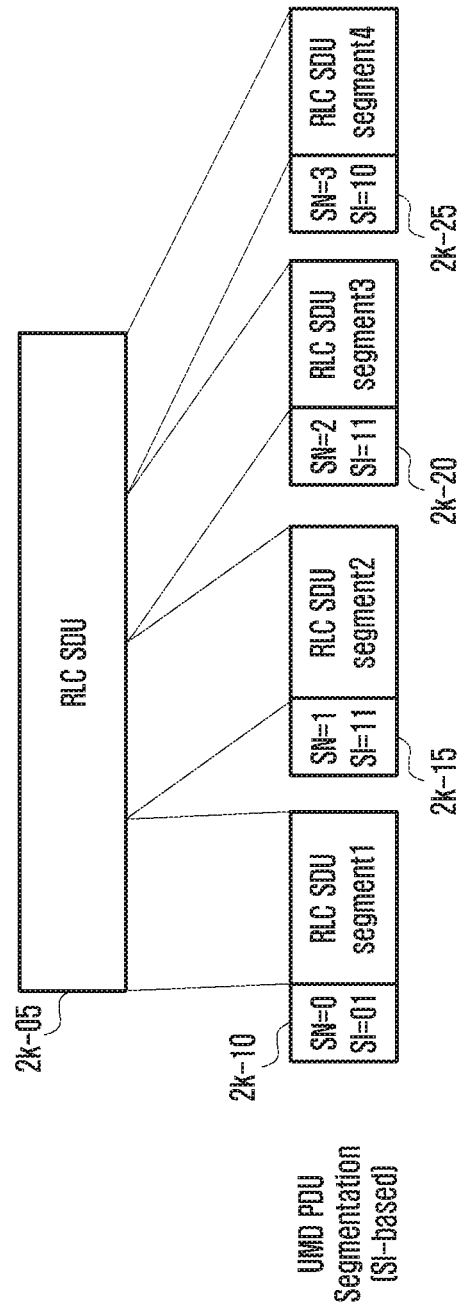
FIG. 2K is a diagram illustrating SI field-based segmentation according to an embodiment of the disclosure.

FIG. 2K is a diagram illustrating SI field-based segmentation according to an embodiment of the disclosure.

Referring to FIG. 2K, the SI field-based segmentation proposed in FIG. 2K does not require an SO field unlike the SO field- and SI field-based segmentation proposed in FIG. 2E. For example, there is an advantage in that overhead is much small. That is, since an SO field corresponding to 2 bytes is not necessary, overhead is reduced and the waste of transmission resources can be reduced.

The greatest difference between the segmentation method proposed in FIG. 2E and the SI field-based segmentation proposed in FIG. 2K includes two points.

1. RLC serial number allocation: In FIG. 2E, multiple segments have the same RLC serial number although they are generated through a segmentation operation with respect to one RLC PDU. For example, four segments have the same RLC serial number although the four segments include a segment 1, a segment 2, a segment 3, and a segment 4 by performing a segmentation operation on one RLC PDU. The four segments may be classified by indicating the SO field of each segment using an offset. In contrast, in the SI field-based segmentation proposed in FIG. 2K, when four segments 2k-10, 2k-15, 2k-20, and 2k-25 are generated as described above with respect to one RLC PDU 2k-05, different RLC serial numbers are assigned to the respective segments. For example, RLC serial numbers 0, 1, 2, and 3 are assigned to respective segments, and an SI field is configured depending on whether a segment is the first segment, a middle segment or the last segment. Accordingly, the sequence of the segments may be identified using the SI fields. When three or more segments are generated, multiple segments (i.e., segments having the same SI field) in the middle may be classified in order of their RLC serial number. Accordingly, a reception stage may assemble the segments through only a combination of the RLC serial numbers and FI fields (without an SO field).

2. SO field not used: In FIG. 2E, the segments have to be classified using the SO fields because the same RLC serial number is assigned. In contrast, in FIG. 2K, an SO field is not necessary because different RLC serial numbers are assigned to respective segments and SI fields are also configured.

The SI field may be defined as follows or may be called a different name.

TABLE 3

| Value | Description |
|---|---|
| 00 | Complete RLC PDU |
| 01 | First segment of RLC PDU |
| 10 | Last segment of RLC PDU |
| 11 | Middle segment of RLC PDU |

When the SI field is 00, it indicates a complete RLC PDU that has not been segmented. When the SI field is 01, it indicates the foremost RLC PDU segment that has been segmented. When the SI field is 10, it indicates the last RLC PDU segment that has been segmented. When the SI field is 11, it indicates a middle RLC PDU segment that has been segmented. A mapping relation between the 2 bits and the four types of information (the complete RLC PDU, the foremost segment, the last segment, and the middle segment) may have a total of 4×3×2×1=24 types, and illustrates only one of the types. The embodiments of the disclosure include all of the 24 types of mapping.

Figure 2L:
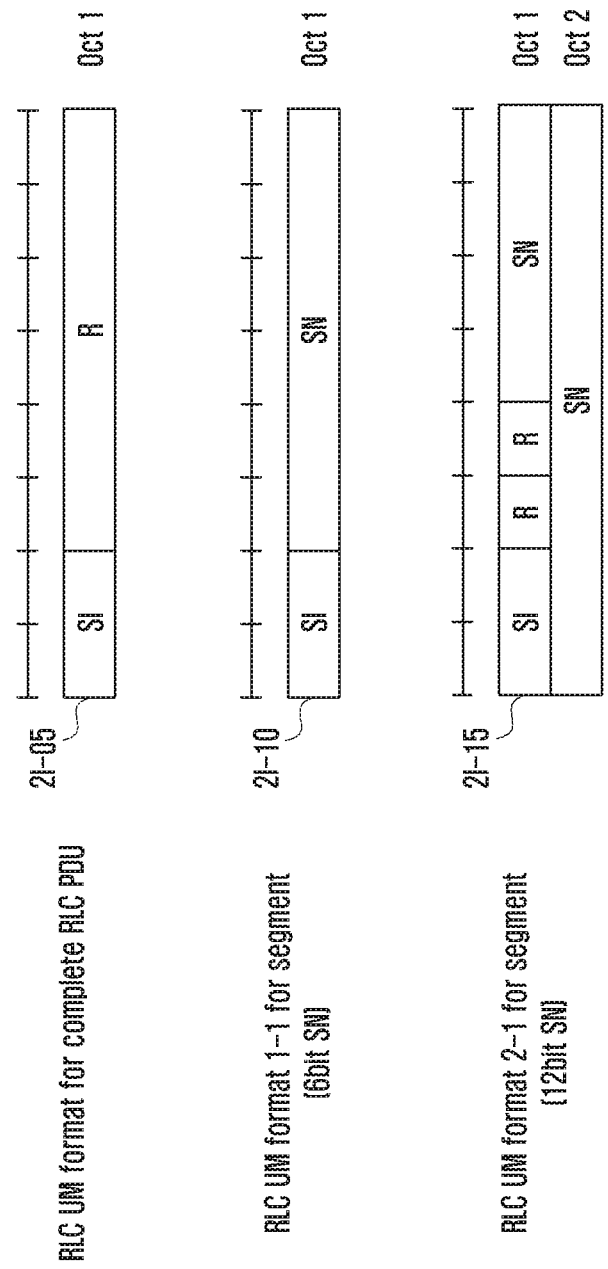
FIG. 2L illustrates a structure of an RLC header which may be applied in an RLC UM mode according to an embodiment of the disclosure.

FIG. 2L illustrates a structure of an RLC header which may be applied in an RLC UM mode in an embodiment of the disclosure.

Referring to FIG. 2L, a structure of an RLC header is illustrated when the serial number of a 6-bit or 12 bit-length is used in the SI field-based segmentation operation described with reference to FIG. 2K if the RLC UM mode (if ARQ is not supported) is not used in one embodiment of the disclosure.

The structure of the RLC header may include some of the fields described with reference to FIG. 2K or another new field. The RLC header may have a different structure depending on the length of each field, such as a different RLC serial number length, and the location of each field. R refers to reserved bits, and the structure of the RLC header may not have an RF field and an E field. An SI field functions to indicate a complete RLC PDU (or complete RLC PDU) on which a segmentation operation has not been performed and the first segment, a middle segment, and the last segment on which a segmentation operation has been performed, which have been described with reference to FIG. 2K.

In the case of the RLC UM mode, An RLC serial number is not necessary for the complete RLC PDU (i.e., an RLC PDU on which a segmentation operation has not been performed). There are multiple cases where the RLC serial number is necessary. For example, the RLC serial number is necessary for reordering, redundancy check, lost packet detection and ARQ function support, and a segmented segment reassembly. However, in the new NR or 5G, reordering does not need to be performed in the RLC layer, redundancy check may be instead performed in the PDCP layer, and the lost packet detection and ARQ function is not supported in the RLC UM mode. Accordingly, the RLC serial number is necessary for only a segmented RLC PDU segment. Accordingly, the RLC serial number may not be necessary for a complete RLC PDU.

In the case of the RLC UM mode, one embodiment of the disclosure proposes a method of using the same header format as 2l-05 without using an RLC serial number in a complete RLC PDU (If whether an RLC SN or an RLC header is present is indicated by a 1-bit indicator in the MAC sub-header of the MAC layer, the RLC header itself may be omitted without using the same header format as 2g-05 with respect to a complete RLC PDU. A reception stage may identify the indicator of the MAC sub-header and may be aware that an RLC header is not present and whether a corresponding PDU is a complete RLC PDU). For example, the transmission stage may indicate that an RLC PDU on which a segmentation operation has not been performed is a complete RLC PDU by indicating the SI field of the header of 2l-05 as 00 with respect to the RLC PDU in order to indicate that there is no RLC serial number. The reception stage may check the SI field of the header and may be aware that an RLC serial number is not present if the SI field is 00.

Accordingly, it is not related to the length of an RLC serial number. A 1-byte header, such as 2*l*-05, may be used in a complete RLC PDU. Furthermore, an RLC serial number may be assigned to the first RLC PDU segment on which a segmentation operation has been performed as described above, and thus the RLC header may be used as the format of 2*l*-10 (when the RLC serial number of a 6-bit length is used) or 2*l*-15 (when the RLC serial number of a 12-bit length is used). However, new RLC serial numbers may be respectively assigned to a middle segment and the last segment generated by performing a segmentation operation, an SI field may be configured based on each segment, and the same RLC header format as the format of 2*l*-10 (when the RLC serial number of a 6-bit length is used) or 2*l*-15 (when the RLC serial number of a 12-bit length is used) may be used as the RLC header format. As described above, an RLC serial number is necessary for segments on which a segmentation operation has been performed. The reason for this is that which segments have the sequence of which RLC serial numbers may be identified using only the RLC serial numbers. A reception stage may generate a complete RLC PDU by performing reassembly based on the relation, may perform data processing, and may transmit an RLC SDU to a higher layer.

Whether the RLC serial number will be used in the complete RLC PDU may be configured for each bearer or logical channel as in FIG. 2D through the RRC message in operations 2*d*-10, 2*d*-40, 2*d*-75.

A second embodiment of the disclosure in which a serial number is not used in the RLC UM mode is as follows.

For example, if an RLC serial number is configured to be not used, a transmission stage may attach the same 1-byte RLC header as 2*l*-05 not having an RLC serial number to an RLC SDU on which a segmentation operation has not been performed (performs an operation of setting an SI field to 00 when configuring an RLC header and configuring an RLC header to which an SO field has not been added), and may perform transmission by transmitting the RLC SDU to a lower layer. However, if an RLC serial number has been configured to be not used so as to reduce overhead, the transmission stage has to add an RLC serial number to an RLC SDU on which a segmentation operation has been performed and to use an SI field, such as that described with reference to FIG. 2K. The reason why the RLC header is configured by assigning a new RLC serial number for each segment and configuring an SI field is that a reception stage can receive segmented RLC SDU segments and restore a complete RLC SDU by reassembling the RLC SDU segments. Accordingly, although the RLC serial number is configured to be not used in the RLC UM mode, if a segmentation operation has been performed, the same RLC header as 2*l*-10 or 2*l*-15 needs to be applied.

In summary, the transmission stage attaches the same 1-byte RLC header as 2*l*-05 not having an RLC serial number to an RLC SDU on which a segmentation operation has not been performed based on whether a segmentation operation has been performed on the RLC SDU, and transmits the RLC SDU to a lower layer. Furthermore, the transmission stage updates a corresponding SI field depending on the type (the first, a middle and the last) of a segment segmented as described above with respect to an RLC SDU on which a segmentation operation has been performed, configures an RLC header by sequentially adding different RLC serial numbers to respective segments, and transmits the RLC SDU to a lower layer.

The reception stage receives an RLC SDU, identifies an SI field in the RLC header of the RLC SDU, and determines whether the received RLC SDU is an RLC SDU (i.e., complete RLC SDU) on which a segmentation operation has not been performed or whether the received RLC SDU is an RLC SDU (i.e., segment) on which a segmentation operation has been performed. If the received RLC SDU is an RLC SDU on which a segmentation operation has not been performed, the reception stage may delete the RLC header and upload the RLC SDU to a higher layer. If the received RLC SDU is an RLC SDU on which a segmentation operation has been performed, the reception stage checks an SI field, determines that the checked SI field corresponds to any one of the first, middle and last segments, reorders RLC serial numbers by taking an RLC serial number into consideration, generates a complete RLC SDU through reassembly when a reassembly function is triggered by a window or timer, transmits the complete RLC SDU to a higher layer, and discards the received RLC SDU if the reassembly is impossible (or when the timer expires, packets left in the buffer may be immediately discarded).

The reception stage in the RLC UM mode may operate based on a window or may operate based on a timer.

In one embodiment of the disclosure, the (2-1) embodiment of an operation of the reception stage in the RLC UM mode is as follows. The (2-1) embodiment is an operation of the reception stage driven based on a window.

When the reception stage in the RLC UM mode operates based on the window, it operates an RLC reception window, and the window may operate in a size half the RLC serial number. The lower edge of the window may be set as a serial number obtained by subtracting the size of an RLC window from an upper edge. The upper edge may be set as the highest RLC serial number received from a reception stage RLC. Accordingly, if the received RLC serial number has a higher value than the RLC serial numbers within the window, the window moves based on the value. If the serial number of the received RLC PDU has a value greater than the received window upper edge, the window moves forward. In contrast, if the serial number of the received RLC PDU has a value smaller than the received window lower edge, the RLC layer of the reception stage may discard the received RLC PDU, may check whether a redundant RLC PDU is received with respect to the RLC serial number within the window, and may discard the redundant RLC PDU. Furthermore, if an RLC PDU segment having an RLC serial number within the window arrives, the reception stage may perform an operation of storing the RLC PDU segment, generating a complete RLC PDU by performing a reassembly procedure when the lower edge of the window passes through an RLC serial number corresponding to the RLC PDU segment, transmitting the complete RLC PDU to a higher layer, and discarding RLC PDU segments if a complete RLC PDU is not generated. Furthermore, the RLC layer of the reception stage performs a procedure of identifying an SI field, directly uploading the RLC PDU to a higher layer if the RLC PDU is an RLC PDU on which a segmentation operation has not been performed, storing the RLC PDU when an SI field indicates the RLC PDU on which a segmentation operation has been performed, performing a reassembly procedure when the reassembly procedure is triggered (i.e., a lower edge moves to a value greater than the RLC serial number of segments) by a window as described above, and uploading the RLC PDU to a higher layer or discarding the RLC PDU.

In one embodiment of the disclosure, the (2-2) embodiment of an operation of the reception stage in the RLC UM mode is as follows. The (2-2) embodiment is an operation of the reception stage driven based on a window and a timer.

When the reception stage in the RLC UM mode operates based on the window, it operates an RLC reception window, and the window may operate in a size half the RLC serial number. The lower edge of the window may be set as a serial number obtained by subtracting the size of an RLC window from an upper edge. The upper edge may be set as the highest RLC serial number received from a reception stage RLC. Accordingly, if the received RLC serial number has a higher value than the RLC serial numbers within the window, the window moves based on the value. If the serial number of the received RLC PDU has a value greater than the received window upper edge, the window moves forward. In contrast, if the serial number of the received RLC PDU has a value smaller than the received window lower edge, the RLC layer of the reception stage may discard the received RLC PDU, may check whether a redundant RLC PDU is received with respect to the RLC serial number within the window, and may discard the redundant RLC PDU.

One timer may operate within the window. The time when the timer is driven may be one or more of the followings.

1. When (the timer is not now driven and) a lost packet is detected through a window operation, that is, when a gap is checked between RLC serial numbers, 2. When (the timer is not now driven and) a given segment arrives at a received RLC UM PDU, 3. When (the timer is not now driven and) a given segment arrives at a received RLC UM PDU within one RLC serial number, 4. When (the timer is not now driven and) segments are not sequentially received in a received RLC UM PDU within one RLC serial number and the loss of a segment is detected or a gap is checked between segments within one RLC serial number, 5. When (the timer is not now driven and) the second segment or a subsequent segment are arrived, but cannot form a complete RLC PDU other than a case where the first segment is arrived at a received RLC UM PDU within one RLC serial number (to drive a timer may not be preferred because the second segment has not been transmitted by a transmission stage), and 6. When (the timer is not now driven and) a segment other than the first segment arrives at a received RLC UM PDU within one RLC serial number.

If the timer triggering condition has been satisfied, but the timer is already driven, a corresponding segment has only to be stored in the buffer (if segments having correct order (or lost segment) have been arrived, but a complete RLC PDU may not be reassembled, the timer may be updated and restarted.)

When an RLC PDU segment having an RLC serial number within a window is arrived, the reception stage stores the RLC PDU segment. If the lower edge of the window passes through an RLC serial number corresponding to the RLC PDU segment or a set timer expires, the RLC layer of the reception stage may perform an operation of generating a complete RLC PDU by performing a reassembly procedure, transmitting the complete RLC PDU to a higher layer, and discarding RLC PDU segments if a complete RLC PDU is not generated. Furthermore, the RLC layer of the reception stage performs a procedure of identifying an SI field, directly transmitting the RLC PDU to a higher layer if the RLC PDU is an RLC PDU on which a segmentation operation has not been performed, storing the RLC PDU if the SI field indicates an RLC PDU on which a segmentation operation has been performed, performing a reassembly procedure when the reassembly procedure is triggered (if a lower edge moves to a value greater than the RLC serial number of segments) by a window or timer as described above, and uploading the RLC PDU to a higher layer or discarding the RLC PDU.

When the reception stage in the RLC UM mode operates based on the timer, the RLC layer of the reception stage in the RLC UM mode drives the timer. Multiple timers may be driven or a single time may be driven.

In one embodiment of the disclosure, the (3-3) embodiment of operations of a transmission stage and a reception stage in the RLC UM mode is as follows. The (3-3) embodiment corresponds to the operations of the transmission stage and the reception stage driven based on one timer (i.e., reassembly timer).

When only one timer is driven, the transmission stage and the reception stage configure an entity for the RLC UM mode. Furthermore, the RLC UM mode device of the transmission stage may manage a variable called "VT(S)" (it may be reused as a different variable or may be called a different name). The variable called "VT(S)" is an RLC serial number value assigned to segments on which a segmentation operation has been performed in the transmission stage. Segmented segments have different RLC serial numbers, that is, different VT(S), with respect to one RLC PDU. The reception stage may set a timer and timer value configured by an ENB. The VT(S) value may be initially set to 0.

When data occurs in the RLC UM mode, the transmission stage may configure an RLC UM PDU and may also previously configure a MAC SDU and a MAC sub-header. Thereafter, when a transmission resource is identified or received, the transmission stage determines whether to segment and transmit RLC UM PDUs based on the size of the transmission resource. In the case of a complete RLC PDU on which segmentation transmission is not performed, the transmission stage configures a 1-byte RLC header not including an RLC serial number (1g-05), and maintains a VT(S) value. For example, the transmission stage does not assign an RLC serial number. If it is determined that segmentation transmission is to be performed on any RLC PDU, the transmission stage configures a header including an RLC serial number (e.g., configure a header, such as 2l-05). When the segmentation transmission is performed, a new RLC serial number (new VT(S) value) is assigned to each segment, and the VT(S) value is increased by 1. For example, whenever a new RLC serial number (new VT(S) value) is assigned to each segment, the VT(S) value is increased by 1. Furthermore, when a segmentation operation is performed on a next RLC PDU, the RLC serial number continues to be sequentially increased and assigned.

The reception stage receives the RLC UM PDU. The RLC layer of the reception stage may identify an SI field, may perform RLC layer data processing if the RLC UM PDU is the same as an RLC PDU on which a segmentation operation has not been performed (header is removed), may directly upload the RLC UM PDU to a higher layer, may identify an SI field, may store the RLC PDU if the SI field indicates an RLC PDU on which a segmentation operation has been performed, and may drive a timer. If a single complete RLC PDU can be configured by reassembling a received segment and segments stored in the buffer, the RLC layer of the reception stage may perform RLC layer data processing (header is removed) and directly upload the complete RLC PDU to a higher layer. If a single complete RLC PDU cannot be configured by reassembling the received segment and the segments stored in the buffer, the RLC layer of the reception stage may store the RLC PDU in the buffer, may identify a subsequently received RLC PDU, and may store it until reassembly is attempted. The time when the timer is driven may be one or more of the followings.

1. When (the timer is not now driven and) a lost packet is detected,
2. When (the timer is not now driven and) a given segment arrives at a received RLC UM PDU,
3. When (the timer is not now driven and) a given segment arrives at a received RLC UM PDU within one RLC serial number,
4. When (the timer is not now driven and) segments are not sequentially received in a received RLC UM PDU within one RLC serial number and the loss of a segment is detected or a gap is checked between segments within one RLC serial number,
5. When (the timer is not now driven and) the second segment or a subsequent segment are arrived, but cannot form a complete RLC PDU other than a case where the first segment is arrived at a received RLC UM PDU within one RLC serial number (to drive a timer may not be preferred because the second segment has not been transmitted by a transmission stage), and
6. When (the timer is not now driven and) a segment other than the first segment arrives at a received RLC UM PDU within one RLC serial number.

If the timer triggering condition has been satisfied, but the timer is already driven, a corresponding segment has only to be stored in the buffer (if segments having correct order (or lost segment) have been arrived, but a complete RLC PDU may not be reassembled, the timer may be updated and restarted.)

When the time expires, the reception stage discards segments corresponding to all of RLC serial numbers related to the timer or all of segments related to the timers from the buffer. Alternatively, when the timer expires, the reception stage attempts reassembly on segments corresponding to all of RLC serial numbers related to the timer or all of segments related to the timers, and discards all of them from the buffer if a complete RLC PDU cannot be configured (or when the timer expires, the buffer may be immediately emptied without making a reassembly attempt, for example).

In both the case where the timer is not driven and the case where the timer is being driven, if a received RLC PDU is a segment, the reception stage may always attempt reassembly between the segment and the segments of a corresponding RLC serial number stored in the buffer. If a complete RLC PDU can be configured by reassembling the segments, the reception stage may directly transmit the completed RLC PDU to a higher layer.

Whenever RLC UM PDUs are received, the reception stage repeats the process. When an RLC PDU segment is arrived, the RLC layer of the reception stage checks whether the timer is being driven based on a triggering condition and restarts the timer if the timer has not been driven.

In one embodiment of the disclosure, the (2-4) embodiment of operations of a transmission stage and reception stage in the RLC UM mode is as follows. The (2-4) embodiment corresponds to the operations of the transmission stage and the reception stage performed based on a plurality of timers (i.e., reassembly timers).

If a plurality of timers is driven, the timers may be driven for each RLC serial number.

The transmission stage and the reception stage configure an entity for the RLC UM mode. Furthermore, the RLC UM mode device of the transmission stage may manage a variable called "VT(S)" (it may be reused as a different variable or may be called a different name). The variable called "VT(S)" is an RLC serial number value assigned to segments on which a segmentation operation has been performed in the transmission stage, and segments segmented with respect to one RLC PDU have different RLC serial numbers, that is, different VT(S) values. Furthermore, if a segmentation operation is performed on a next RLC PDU, the RLC serial number continues to be sequentially increased and assigned. The reception stage may set a timer and timer value configured by an ENB. The VT(S) value may be initially set to 0.

When data occurs in the RLC UM mode, the transmission stage may configure an RLC UM PDU and may also previously configure a MAC SDU and a MAC sub-header. Thereafter, when a transmission resource is identified or received, the transmission stage determines whether to segment and transmit RLC UM PDUs based on the size of the transmission resource. In the case of a complete RLC PDU on which segmentation transmission is not performed, the transmission stage configures a 1-byte RLC header not including an RLC serial number (1g-05), and maintains a VT(S) value. For example, the transmission stage does not assign an RLC serial number. If it is determined that segmentation transmission is to be performed on any RLC PDU, the transmission stage configures a header including an RLC serial number (e.g., configure a header, such as 2l-05). When the segmentation transmission is performed, a new RLC serial number (VT(S) value) is assigned to each segment generated by performing segmentation transmission. When the new RLC serial number (VT(S) value) is assigned, the VT(S) value is increased by 1 and thus different RLC serial numbers are sequentially assigned to the respective segments.

The reception stage receives the RLC UM PDU. The RLC layer of the reception stage may identify an SI field, may perform RLC layer data processing if the RLC UM PDU is the same as an RLC PDU on which a segmentation operation has not been performed (header is removed), may directly upload the RLC UM PDU to a higher layer, may identify an SI field, may store the RLC PDU if the SI field indicates an RLC PDU on which a segmentation operation has been performed, and may drive a timer. If a single complete RLC PDU can be configured by reassembling a received segment and segments stored in the buffer, the RLC layer of the reception stage may perform RLC layer data processing (header is removed) and directly upload the complete RLC PDU to a higher layer. If a single complete RLC PDU cannot be configured by reassembling the received segment and the segments stored in the buffer, the RLC layer of the reception stage may store the RLC PDU in the buffer, may identify a subsequently received RLC PDU, and may store it until reassembly is attempted. The timers may be individually driven one by one for each RLC serial number. For example, when segments corresponding to different RLC serial numbers are sequentially received, timers corresponding to the respective RLC serial numbers may be driven. The time when the timer is driven may be one or more of the followings.

1. When (the timer is not now driven with respect to a corresponding RLC serial number and) a lost packet is detected,
2. When (the timer is not now driven with respect to a corresponding RLC serial number and) a given segment arrives at a received RLC UM PDU,
3. When (the timer is not now driven with respect to a corresponding RLC serial number and) a given segment arrives at a received RLC UM PDU within one RLC serial number, 4. When (the timer is not now driven with respect to a corresponding RLC serial number and) segments are not sequentially received in a received RLC UM PDU within one RLC serial number and the loss of a segment is detected or a gap is checked between segments within one RLC serial number, 5. When (the timer is not now driven with respect to a corresponding RLC serial number and) the second segment or a subsequent segment are arrived, but cannot form a complete RLC PDU other than a case where the first segment is arrived at a received RLC UM PDU within one RLC serial number (to drive a timer may not be preferred because the second segment has not been transmitted by a transmission stage), and 6. When (the timer is not now driven with respect to a corresponding RLC serial number and) a segment other than the first segment arrives at a received RLC UM PDU within one RLC serial number.

If the timer triggering condition has been satisfied, but the timer is already driven, a corresponding segment has only to be stored in the buffer (if segments having correct order (or lost segment) have been arrived, but a complete RLC PDU may not be reassembled, the timer may be updated and restarted.)

When each of timers expires, the reception stage discards segments corresponding to RLC serial numbers related to the respective timers or all of segments related to the timers from the buffer. Alternatively, when each of the times expires, the reception stage attempt reassembly on the segments corresponding to the RLC serial numbers related to the respective timers or all of the segments related to the timers, and discards all the segments from the buffer if a complete RLC PDU cannot be configured (or reassembly is not attempted, and when the timer expires, the buffer may be immediately emptied).

In both the case where the timer is not driven and the case where the timer is being driven, if a received RLC PDU is a segment, the reception stage may always attempt reassembly between the segment and the segments of a corresponding RLC serial number stored in the buffer. If a complete RLC PDU can be configured by reassembling the segments, the reception stage may directly transmit the completed RLC PDU to a higher layer.

Whenever RLC UM PDUs are received, the reception stage repeats the process. When an RLC PDU segment is arrived, the RLC layer of the reception stage checks whether the timer is being driven based on a triggering condition and restarts the timer if the timer has not been driven.

The methods proposed in FIGS. 2K and 2L are summarized below. In the RLC UM mode, an RLC serial number is not assigned to a complete RLC PDU on which a segmentation operation has not been performed, different RLC serial numbers are sequentially assigned to segmented segments only when a segmentation operation is performed, SI fields are configured based on the respective segments so that a reception stage can successfully reassemble the segments using the RLC serial numbers and the SI fields. Accordingly, overhead can be reduced.

Furthermore, the above-proposed methods do not influence the data pre-processing process of NR or 5G and can reduce data processing time.

Figure 2M:
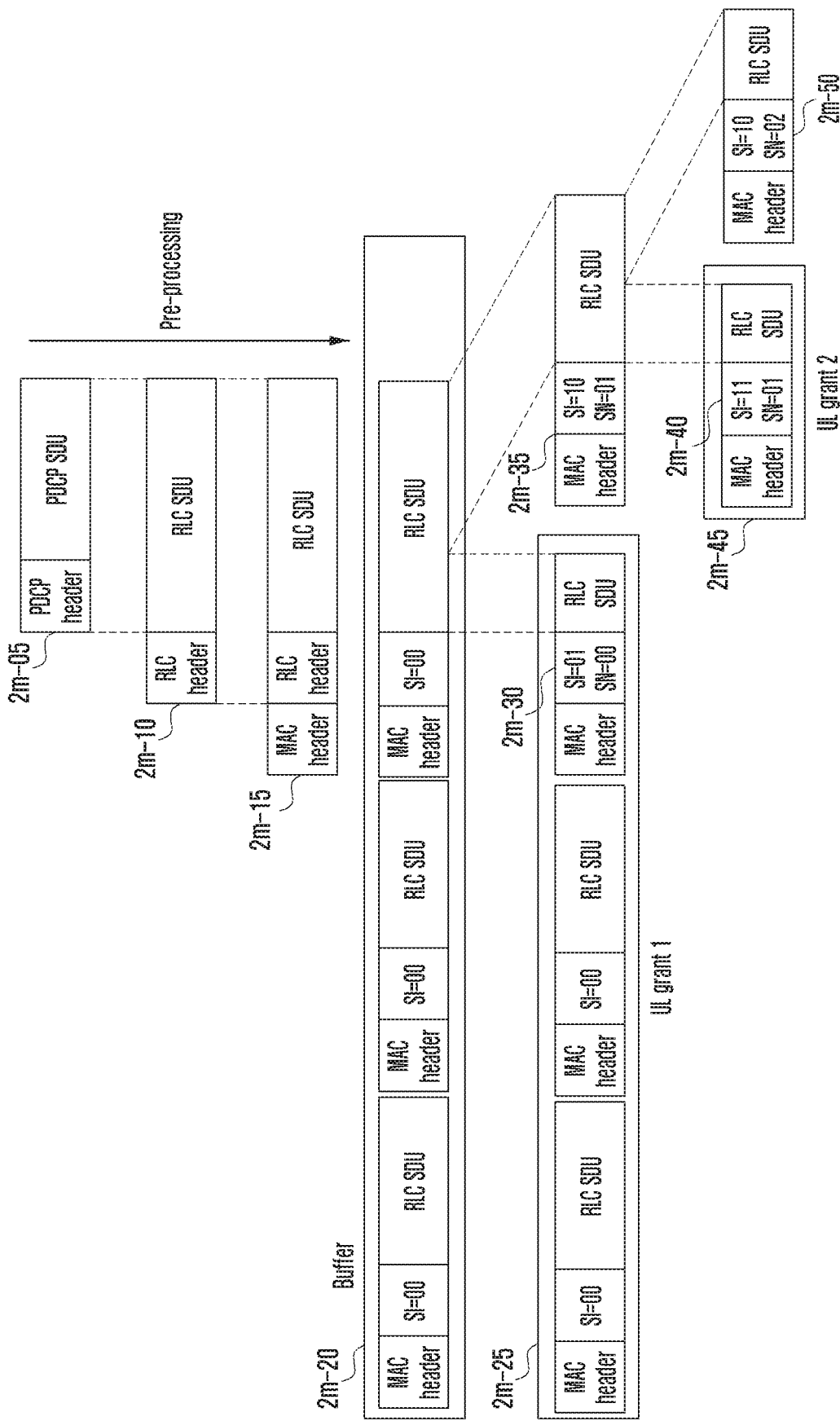
FIG. 2M is a diagram illustrating a procedure of performing data pre-processing in a transmission operation of an RLC UM mode according to an embodiment of the disclosure.

FIG. 2M is a diagram illustrating a procedure of performing data pre-processing in a transmission operation of an RLC UM mode according to an embodiment of the disclosure.

Referring to FIG. 2M, when an IP packet reaches the PDCP layer, the PDCP layer may attach a PDCP header to the IP packet and transmit a PDCP PDU (or RLC SDU) $2n$-05 to the RLC layer. The RLC layer may first attach a header, such as $2m$-05, may complete an RLC PDU $2m$-10 by configuring an RLC header without assigning an RLC serial number, and may transmit the RLC PDU to the MAC layer. The MAC layer may configure an L field by calculating the size of a MAC SDU (or RLC PDU), may set a corresponding logical channel identifier, may configure a MAC sub-header $2m$-15, and may store it in a buffer $2m$-20. Accordingly, data packets received in the PDCP layer using such a method can be stored in the buffer by performing data pre-processing before a transmission resource (UL grant) is received from an ENB. If an UL transmission resource (UL grant 1) $2m$-25 has been received from an ENB, but a segmentation operation must be performed due to an insufficient UL transmission resource, different RLC serial numbers may be assigned to the RLC headers of respective segments as in $2m$-30, corresponding SI fields may be configured based on the segments, and the RLC headers of the segments may be newly configured by configuring headers, such as $2l$-10 or $2l$-15, ($2m$-30, $2m$-35). Furthermore, a MAC PDU may be transmitted using an UL transmission resource. If a second UL transmission resource (UL grant 2) $2m$-45 has been received, but a segmentation operation needs to be performed again due to an insufficient size of the transmission resource, a new RLC serial number may be assigned to a newly added segment like $2m$-40 and $2m$-50, and an RLC header may be newly configured by configuring the SI field of a generated segment on which a segmentation operation has been performed based on a segment.

Accordingly, it may be seen that the transmission/reception operation in the RLC UM mode proposed in FIGS. 2K and 2L according to embodiments of the disclosure can well operate even in the pre-processing procedure as described above.

Second Embodiment

Figure 3A:
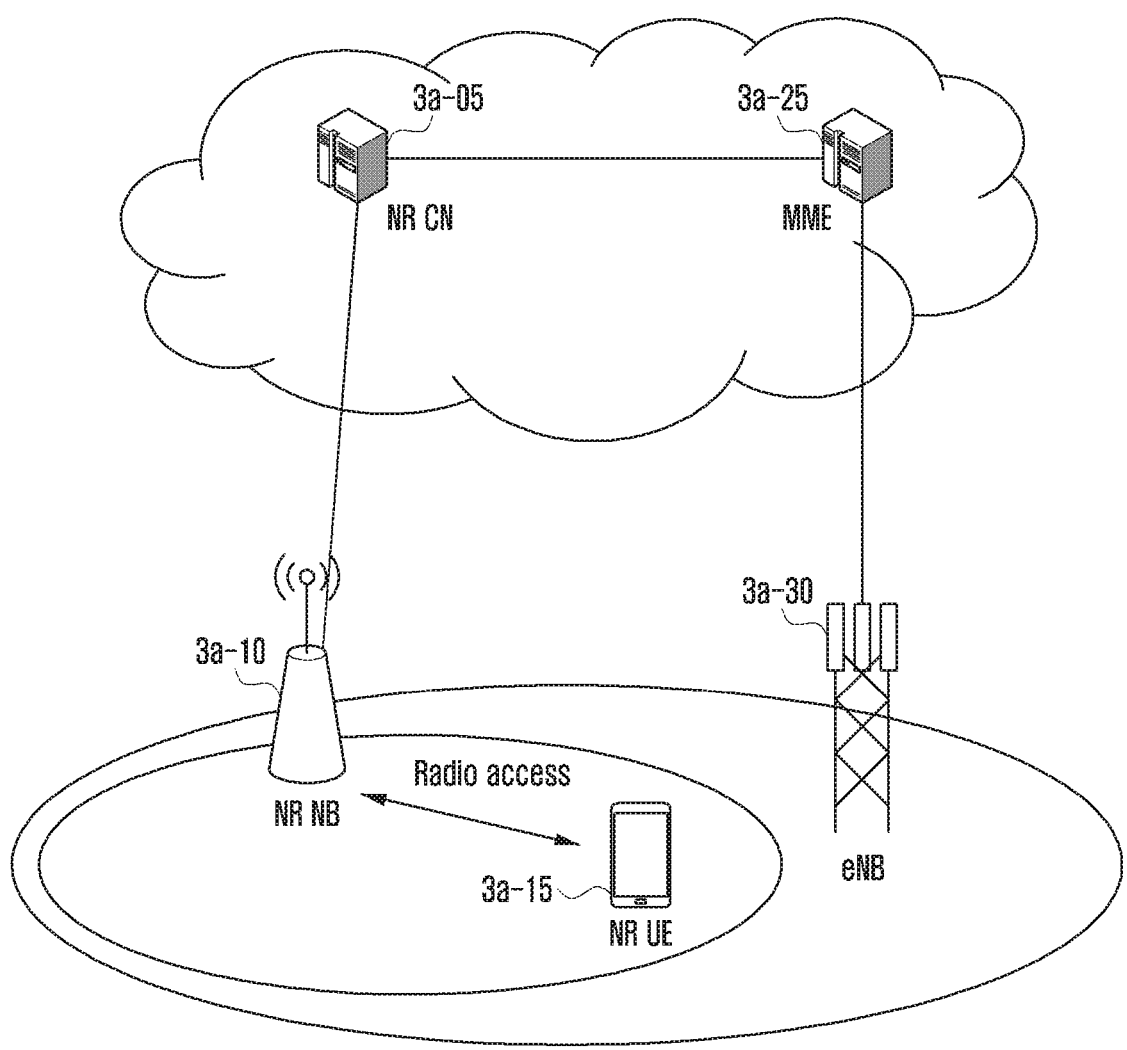
FIG. 3A is a diagram illustrating a structure of a next generation mobile communication system according to an embodiment of the disclosure.

FIG. 3A is a diagram illustrating a structure of an NR or 5G according to an embodiment of the disclosure.

Referring to FIG. 3A, the radio access network of the NR or 5G includes a new radio Node B (ENB) (hereinafter referred to as an "NR NB") $3a$-10 and a new radio core network (NR CN) $3a$-05. A new radio user equipment (hereinafter referred to as an "NR UE or terminal") $3a$-15 accesses an external network through the NR NB $3a$-10 and the NR CN $3a$-05.

In FIG. 3A, the NR NB $3a$-10 corresponds to an Evolved Node B (ENB) of the existing LTE system. The NR NB is connected to the NR UE $3a$-15 through a radio channel and can provide a more excellent service than the existing Node B. The NR or 5G requires a device for performing scheduling by collecting state information, such as the buffer state, available transmission power state, and channel state of UEs, because all of types of user traffic are served through a shared channel. The NR NB $3a$-10 is in charge of the device. In general, one NR NB controls multiple cells. In order to implement ultra-high speed data transfer compared to the existing LTE, the existing maximum bandwidth or more may be used, and the beamforming technology may be additionally grafted using OFDM as a radio access technology. Furthermore, the AMC scheme that determines a modulation scheme and a channel coding rate based on the channel state of a UE is applied. The NR CN $3a$-05 performs functions, such as mobility support, a bearer configuration, and a QoS configuration. The NR CN is in charge of various control functions in addition to a mobility management function for a UE, and is connected to multiple ENBs. Furthermore, the NR or 5G may also operate in conjunction with the existing LTE system. The NR CN is connected to an MME 3a-25 through a network interface. The MME is connected to an eNB 3a-30, that is, the existing ENB.

Figure 3B:
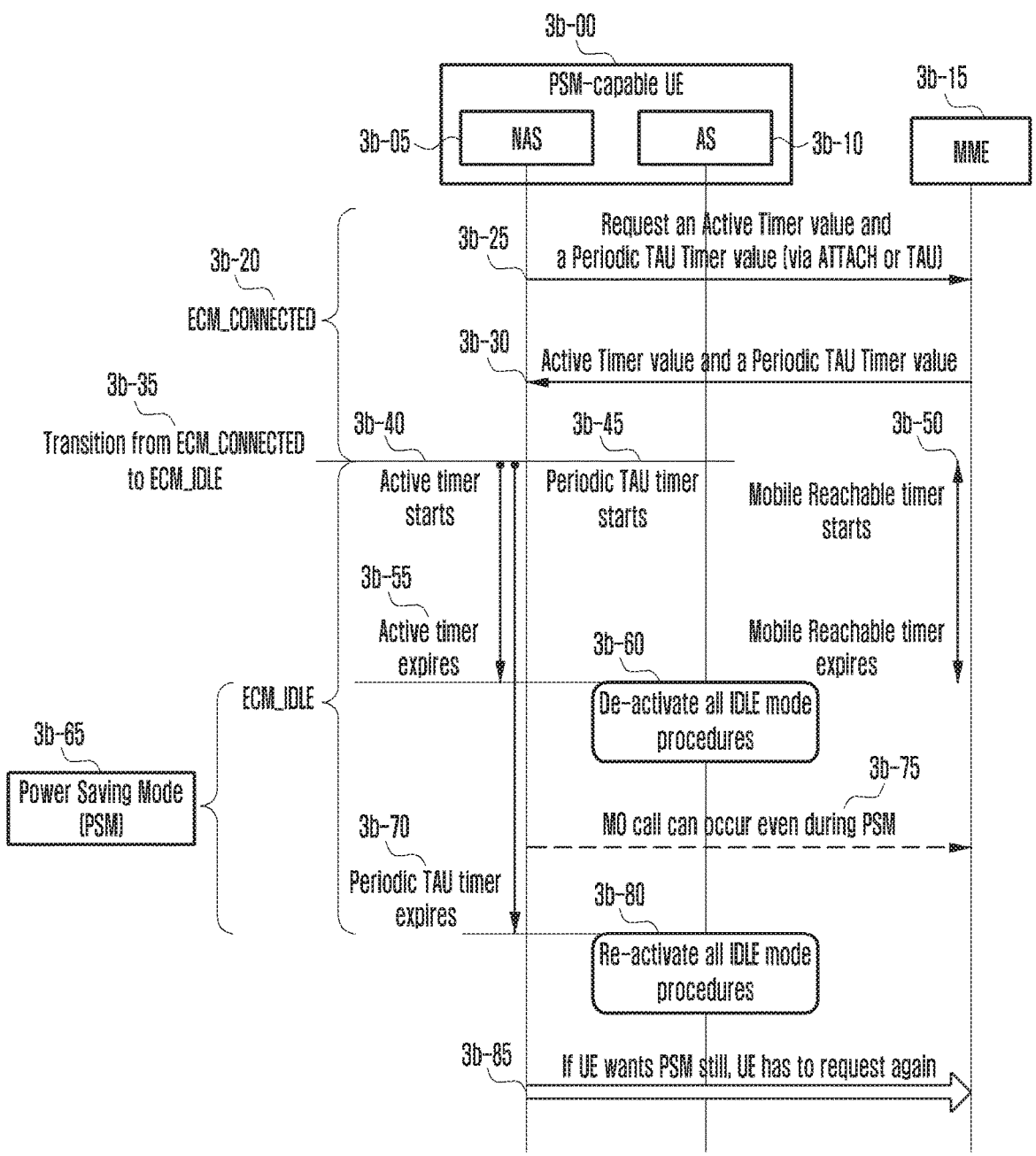
FIG. 3B is a diagram illustrating a power saving mode (PSM) in an LTE technology according to an embodiment of the disclosure.

FIG. 3B is a diagram illustrating a power saving mode (PSM) in an LTE technology according to an embodiment of the disclosure.

Referring to FIG. 3B, the NAS 3b-05 of a UE 3b-00 supporting the PSM requests the configuration of the PSM from an MME 3b-15 of a network in operation 3b-25. The request is performed when the UE performs ATTACH or tracking area update (TAU) on the MME. The term "ATTACH" means a procedure for the UE to be authenticated by the MME and registered with the MME. The MME provides the UE with a registered public land mobile network (PLMN) and equivalent PLMN information through the ATTACH process. The TAU process is performed by the UE in order to notify the network of its location. In the LTE standard technology, for a purpose, such as paging, a network identifies the location of a UE in a TA unit. The TA is a single cell or a set of multiple cells. When a moving UE enters another TA, it notifies a network that it has entered a new TA. The UE has to communicate with the MME in order to perform the ATTACH and TAU process, and thus needs to naturally switch from a standby mode (ECM_IDLE) to a connection mode (ECM_CONNECTED) in operation 3b-20. In operation 3b-30, the MME approves the PSM request of the UE and provides the UE with two types of timer values. One is an active timer, and the other is a periodic TAU timer. The two timers 3b-40 and 3b-45 start when the UE switches from the connection mode to the standby mode in operation 3b-35. At the same time, the MME drives one timer in operation 3b-50. The UE performs the aforementioned standby mode operation until the active timer expires. When the active timer expires, the UE switches to the PSM in operation 3b-65 in which all of the standby mode operation and the AS 3b-10 timers are stopped in operation 3b-60. When the periodic TAU timer expires in operation 3b-70 or an MO call is triggered in operation 3b-75, the UE deviates from the PSM, switches to the standby mode again, and performs a standby mode operation in operation 3b-80. If the UE wants to trigger the PSM again, it needs to request the PSM from the MME in operation 3b-85.

FIGS. 3CA and 3CB are diagrams illustrating a process of performing mobile-initiated connection according to an embodiment of the disclosure.

Referring to FIG. 3CA, a UE 3c-05 switches to the connection mode by performing an RRC connection with a gNB 3c-10 in operation 3c-20. In the connection mode, the UE performs a registration request or registration update process on an AMF 3c-15 in operation 3c-25. When performing the process, the UE may request mobile-initiated connection only (MICO) from the AMF. The MICO is very similar to the PSM technology of the existing LTE. The MICO is a technology for minimizing power consumption of a UE. The MICO mode may be set when the UE requests the MICO mode from the AMF. When the UE triggers mobile-originated (MO) data or a given timer expires, the MICO mode is released. A great difference between the MICO and the PSM is that when the MICO is set again after it is released, it is not necessary to request the MICO from the AMF again. In order to set the PSM again after it is released, the PSM must be from the MME in the same manner as the PSM is first set. The AMF determines whether to perform the MICO mode on the UE based on service provide configuration information, UE preference, user information, and a network operation policy in operation 3c-30.

The AMF transmits a registration response message to the UE in operation 3c-35, and at the same time configures the MICO for the UE in operation 3c-40. The registration response message includes configuration information necessary to perform the MICO. The UE applies the configuration information. The configuration information includes a first timer value and a second timer value. The first timer value is shorter than the second timer value. The two timers start to operate in operations 3c-50, 3c-55 when the UE switches to the standby mode in operation 3c-45. When the first timer expires, the UE switches to the MICO mode in operation 3c-60, and all of standby mode operations are stopped in operation 3c-70. The standby mode operations refer to operations performed by the UE in the standby mode, such as a cell measurement operation, cell reselection, and a paging message monitoring operation. When the second timer expires or MO data occurs in operation 3c-75, the UE temporarily stops the MICO mode and switches to the connection mode. When the UE is in the MICO mode, the AMF rejects the transmission request of mobile-terminated (MT) data from an application server in operation 3c-65. When the application server requests the transmission request of MT data, the AMF may notify the application server of MT data transmission when the MT data can be transmitted to the UE whose MICO mode has been temporarily stopped. During the MICO mode, the UE may have moved to a different cell or area. Accordingly, when the second timer expires or MO data occurs, the UE needs to perform a PLMN selection and cell (re)selection process before it switches to the connection mode in operation 3c-80. The UE has already been registered with the AMF, and thus can reduce the time necessary to perform the existing PLMN selection and cell (re)selection process by improving the process.

Referring to FIG. 3CB, an embodiment of the disclosure proposes a method of selecting a cell that belongs to cells belonging to the existing RPLMN or EPLMN and that has signal quality of a specific threshold. An RPLMN or EPLMN is present because the UE had been in the connection mode at least once before it switches to the MICO mode. Accordingly, an operation for such determination is not necessary. If cells belonging to the RPLMN or EPLMN are not present nearby or signal quality does not satisfies a specific threshold, the existing PLMN selection and cell (re)selection process needs to be performed. The UE that has completed the PLMN selection and cell (re)selection process performs an RRC establishment process on the ENB in order to switch to the connection mode in operations 3c-85, 3c-90, and 3c-95. The UE transmits information related to the MICO to the ENB through an uplink message during the RRC establishment process in operation 3c-95. The ENB uses the information to determine the lengthy of an RRC inactivity timer in operation 3c-100. The information is an indicator indicting that the UE had been in the MICO mode prior to a corresponding connection mode and is the time that the UE had stayed in the MICO mode. The role of the indicator may be substituted with stay time information. The UE that has switched to the connection mode performs an area update operation, such as TAU, at least. The area update operation has an object of notifying the AMF of the area where paging for the UE is transmitted. The operation is performed by transmitting a registration update message to the AMF. The AMF identifies that the UE has switched from the MICO mode to the connection mode through the registration update message. Thereafter, the AMF notifies the application server that data may be transmitted to the UE in operation 3c-105. The application server may request MT data transmission along with the data in operation 3c-110. In the connection mode, the UE may transmit MO data in operation 3c-115. The ENB drives the RRC inactivity timer with respect to the UE. The RRC inactivity timer is reset whenever data is transmitted/received to/from the UE. When the timer expires, the ENB enables the UE to switch to the standby mode using an RRC connection release message in operation 3c-120. The UE drives the first timer and the second timer again. When the first timer expires, the UE switches to the MICO mode. If the UE does not want to switch to the MICO mode, the UE may request the AMF to stop the MICO mode in the registration update process during the connection mode.

Figure 3D:
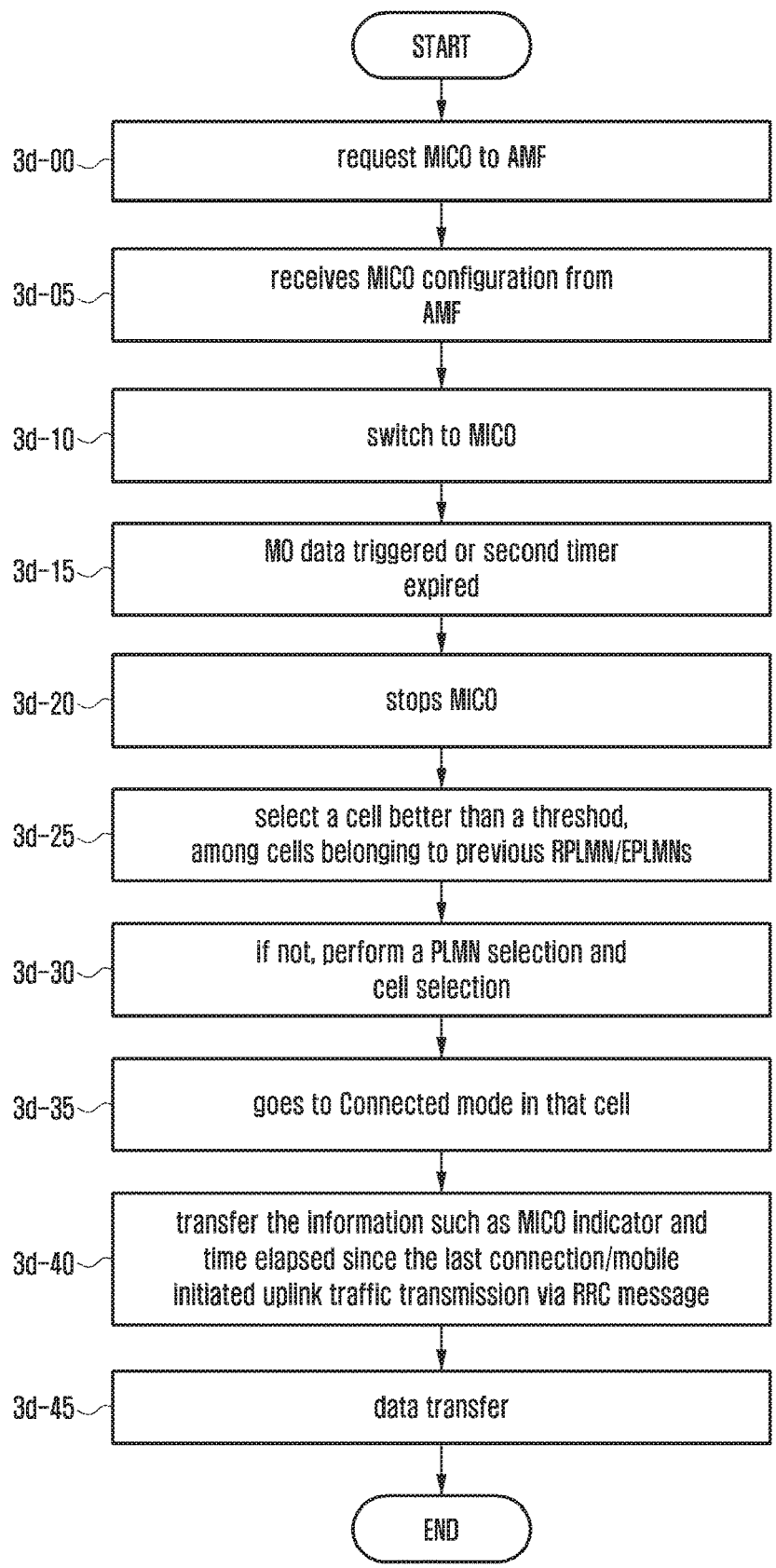
FIG. 3D is a flowchart illustrating an operation of a UE when a mobile-initiated connection only is released according to an embodiment of the disclosure.

FIG. 3D is a flowchart illustrating an operation of a UE when mobile-initiated connection only (MO) is released according to an embodiment of the disclosure.

Referring to FIG. 3D, in operation 3d-00, the UE requests the configuration of the MICO mode from the AMF. The request is performed through a registration request or registration update process. The registration request and the registration update correspond to the ATTACH and TAU process, respectively, in the LTE technology. In operation 3d-05, the UE receives configuration information necessary to switch to the MICO mode from the AMF. The configuration information includes a first timer value and a second timer value. In operation 3d-10, after switching to the standby mode, the UE drives the first timer and the second timer, and switches to the MICO mode when the first timer expires. In operation 3d-15, when MO data is triggered or the second timer expires, the UE attempts to switch to the connection mode. In operation 3d-20, the UE temporarily stops the MICO mode. In operation 3d-25, the UE determines whether there is a cell that belongs to cells belonging to a previously stored RPLMN or EPLMN and that satisfies a specific threshold, and selects a cell that provides the best signal quality. In operation 3d-30, if a cell belonging to the previously stored RPLMN or EPLMN is not present nearby or does not satisfy signal quality of the specific threshold, the UE performs a PLMN selection and cell (re)selection process applied in the existing LTE. For example, a UE AS measures all of neighboring cells, collects PLMN information supported by a neighbor specific cell that provide excellent signal quality, and provides the information to a UE NAS. The UE NAS determines one selected PLMN by taking into consideration HPLMN or EHPLMN information stored in a universal subscriber identity module (USIM). The UE transmits the selected PLMN to the MME through a registration request or registration update process. The MME provides the UE with the RPLMN or EPLMN information as a response thereto. In general, the selected PLMN is set as an RPLMN. In operation 3d-35, the UE performs an RRC establishment operation so as to switch to the connection mode in the selected cell. In operation 3d-40, the UE provides an ENB with MICO mode-related information using one uplink RRC message in the process. The related information is an indicator indicating that the UE had been in the MICO mode prior to a corresponding connection mode or the time that the UE had stayed in the MICO mode. In operation 3d-45, the UE transmits/receives data to/from a network.

Figure 3E:
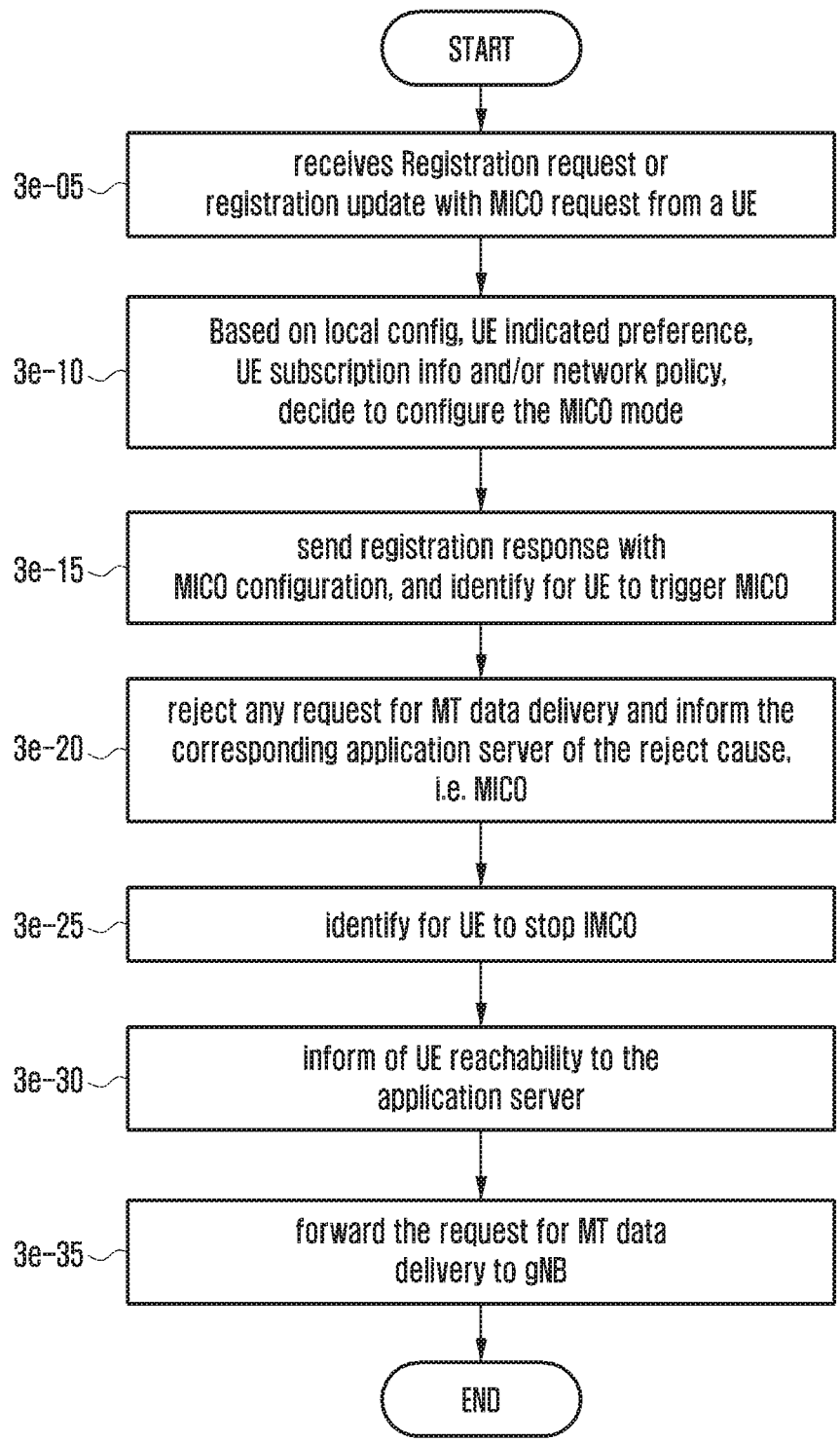
FIG. 3E is an operational flowchart of an authentication management field (AMF) related to a mobile-initiated connection according to an embodiment of the disclosure.

FIG. 3E is an operational flowchart of an AMF related to MO according to an embodiment of the disclosure.

Referring to FIG. 3E, in operation 3e-05, the AMF receives a request for the configuration of the MICO mode from a given UE. In operation 3e-10, the AMF determines whether to perform the MICO mode on the UE based on service provider configuration information, UE preference, user information, and a network operation policy. In operation 3e-15, the AMF transmits a registration response to the UE, and at the same time configures the MICO for the UE. Thereafter, the UE identifies that it has switched to the MICO mode. In operation 3e-20, the AMF rejects a request for MT data transmission from an application server. When the MICO mode is configured, the AMF may provide the application server the rejected cause. In operation 3e-25, the AMF identifies that the MICO mode for the UE has been temporarily stopped. The recognition is possible when the UE performs registration update on the AMF. If the UE includes an indicator indicative of the end of the MICO mode in the registration update, the MICO mode is terminated. In operation 3e-30, the AMF notifies the configured application server that MT data may be transmitted to the UE. In operation 3e-35, the AMF transfers a request for MT data transmission from the application server to an ENB.

Figure 3F:
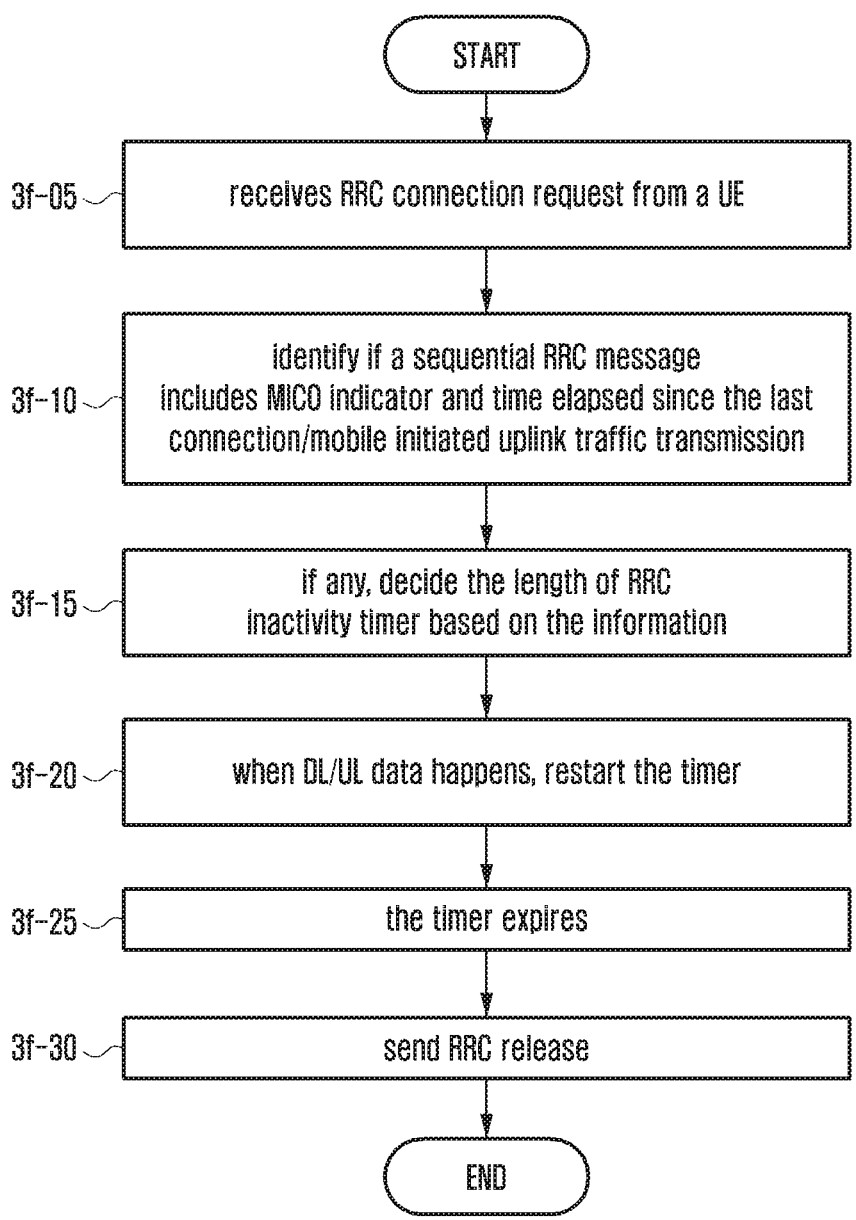
FIG. 3F is a flowchart illustrating an operation of an evolved node B (ENB) related to a mobile-initiated connection according to an embodiment of the disclosure.

FIG. 3F is a flowchart illustrating an operation of an ENB related to MO according to an embodiment of the disclosure.

Referring to FIG. 3F, in operation 3f-05, the ENB receives an RRC connection request message from a given UE. Thereafter, in operation 3f-10, the ENB determines whether an RRC message, including an indicator indicating that the UE had been in the MICO mode prior to a corresponding connection mode and time information indicating that the UE had stayed in the MICO mode, is received from the UE. In operation 3f-15, the ENB determine an RRC activity timer based on the information. In operation 3f-20, the ENB resets the RRC activity timer whenever the transmission/reception of data for the UE occurs. In operation 3f-25, the RRC activity timer expires. In operation 3f-30, the ENB transmits an RRC connection release message to the UE.

Figure 3G:
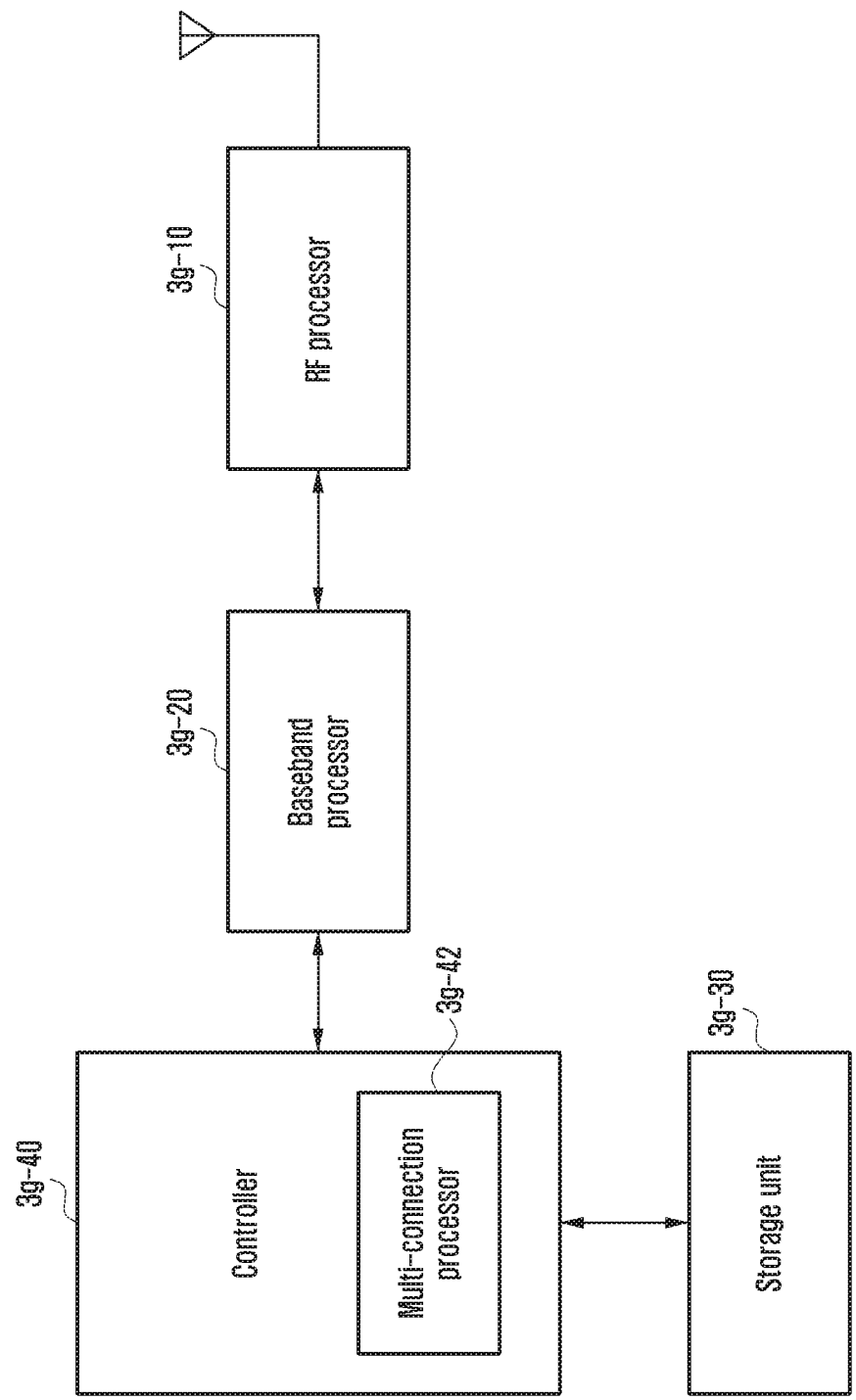
FIG. 3G is a block diagram illustrating an internal structure of a UE according to an embodiment of the disclosure.

FIG. 3G is a block diagram illustrates an internal structure of a UE according to an embodiment of the disclosure.

Referring to FIG. 3G, the UE includes a radio frequency (RF) processor 3g-10, a baseband processor 3g-20, a storage unit 3g-30, and a controller 3g-40.

The RF processor 3g-10 performs a function for transmitting/receiving a signal through a radio channel, such as the band conversion and amplification of a signal. For example, the RF processor 3g-10 up-converts a baseband signal received from the baseband processor 3g-20 into an RF band signal, transmits the RF band signal through an antenna, and down-converts an RF band signal received through the antenna into a baseband signal. For example, the RF processor 3g-10 may include a transmission filter, a reception filter, an amplifier, a mixer, an oscillator, a DAC, and an ADC. In FIG. 3G, only one antenna has been shown, but the UE may include multiple antennas. Furthermore, the RF processor 3g-10 may include multiple RF chains. Furthermore, the RF processor 3g-10 may perform beamforming. For the beamforming, the RF processor 3g-10 may adjust the phase and size of each of signal transmitted/received through multiple antennas or antenna elements. Furthermore, the RF processor may perform MIMO, and may receive multiple layers when performing a MIMO operation.

The baseband processor 3g-20 performs a baseband signal and inter-bit stream conversion function based on the physical layer standard of a system. For example, when data is transmitted, the baseband processor 3g-20 generates complex symbols by coding and modulating a transmission bit stream. Furthermore, when data is received, the baseband processor 3g-20 reconstructs a reception bit stream from a baseband signal received from the RF processor 3g-10 through modulation and demodulation. For example, if the OFDM scheme is applied, when data is transmitted, the baseband processor 3g-20 generates complex symbols by coding and modulating a transmission bit stream, maps the complex symbols to subcarriers, and then configures OFDM symbols through IFFT operation and CP insertion. Furthermore, when data is received, the baseband processor 3g-20 segments a baseband signal received from the RF processor 3g-10 in an OFDM symbol unit, reconstructs signals mapped to subcarriers through FFT operation, and then reconstructs a reception bit stream through modulation and demodulation.

The baseband processor 3g-20 and the RF processor 3g-10 transmit and receive signals as described above. Accordingly, the baseband processor 3g-20 and the RF processor 3g-10 may be called a transmitter, a receiver, a transceiver or a communication unit. Furthermore, at least one of the baseband processor 3g-20 and the RF processor 3g-10 may include multiple communication modules so as to support different multiple radio access technologies. Furthermore, at least one of the baseband processor 3g-20 and the RF processor 3g-10 may include different communication modules for processing signals of different frequency bands. For example, the different radio access technologies may include a wireless LAN (e.g., IEEE 802.11) and a cellular network (e.g., LTE). Furthermore, the different frequency bands may include a super high frequency (SHF) (e.g., 2.NRHz) band and a millimeter wave (e.g., 60 GHz) band.

The storage unit 3g-30 stores data, such as a basic program, an application program, and configuration information for the operation of the UE. Specifically, the storage unit 3g-30 may store information related to a second access node that performs wireless communication using a second radio access technology. Furthermore, the storage unit 3g-30 provides stored data in response to a request from the controller 3g-40.

The controller 3g-40 controls an overall operation of the UE. For example, the controller 3g-40 transmits/receives a signal through the baseband processor 3g-20 and the RF processor 3g-10. Furthermore, the controller 3g-40 write data in the storage unit 3g-40 and reads data from the storage unit 3g-40. To this end, the controller 3g-40 may include at least one processor. For example, the controller 3g-40 may include a communication processor (CP) (e.g., a multi-connection processor 3g-42) performing control for communication and an application processor (AP) controlling a higher layer, such as an application program.

Figure 3H:
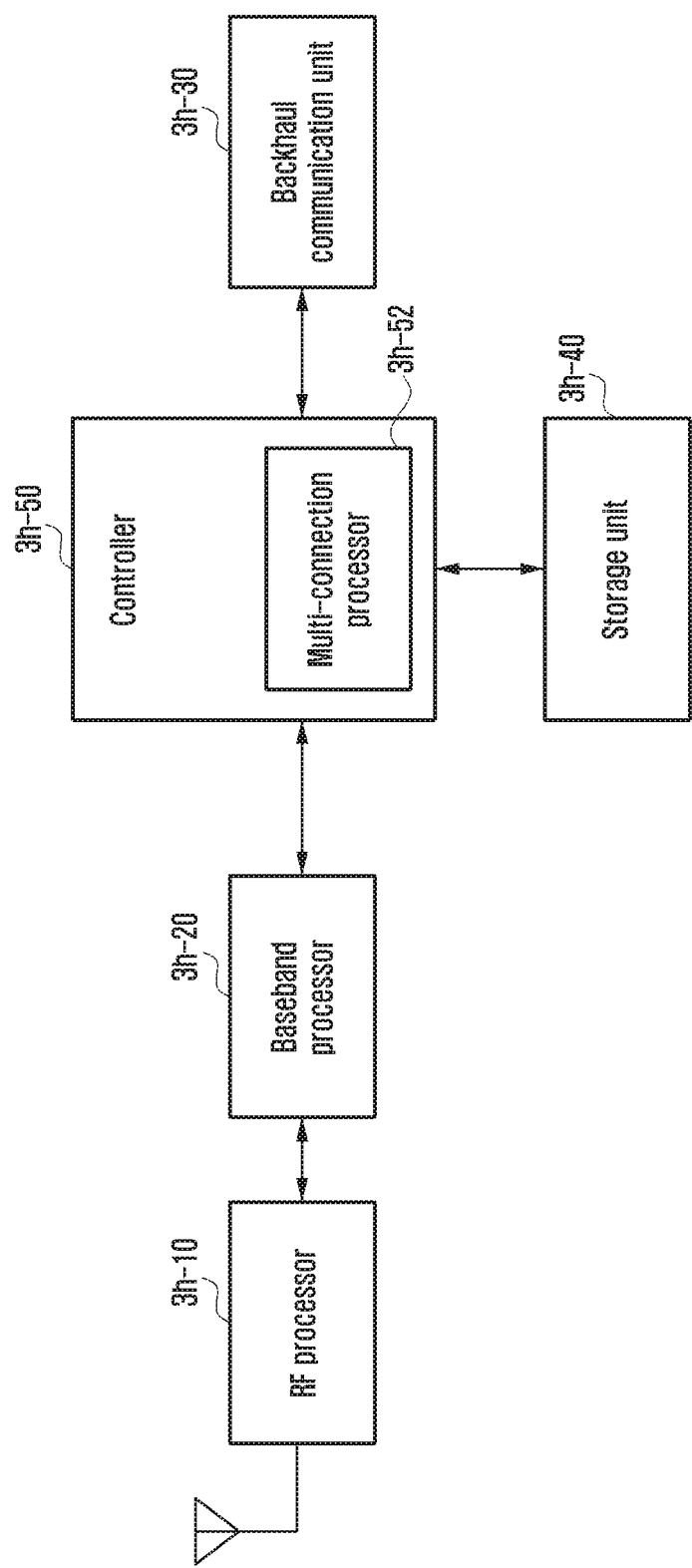
FIG. 3H is a block diagram illustrating a configuration of an ENB according to an embodiment of the disclosure.

FIG. 3H is a block diagram illustrating a configuration of an ENB according to an embodiment of the disclosure.

Referring to FIG. 3H, the ENB includes an RF processor 3h-10, a baseband processor 3h-20, a backhaul communication unit 3h-30, a storage unit 3h-40, and a controller 3h-50.

The RF processor 3h-10 performs a function for transmitting/receiving a signal through a radio channel, such as the band conversion and amplification of a signal. For example, the RF processor 3h-10 up-converts a baseband signal received from the baseband processor 3h-20 into an RF band signal, transmits the RF band signal through the antenna, and down-converts an RF band signal received through the antenna into a baseband signal. For example, the RF processor 3h-10 may include a transmission filter, a reception filter, an amplifier, a mixer, an oscillator, a DAC, and an ADC. In FIG. 3H, only one antenna has been shown, but the ENB may include multiple antennas. Furthermore, the RF processor 3h-10 may include multiple RF chains. Furthermore, the RF processor 3h-10 may perform beamforming. For the beamforming, the RF processor 3h-10 may adjust the phase and size of each of signals transmitted/received multiple antennas or antenna elements. The RF processor may perform a downlink MIMO operation by transmitting one or more layers.

The baseband processor 3h-20 performs a baseband signal and inter-bit stream conversion function of the physical layer standard of a first radio access technology. For example, when data is transmitted, the baseband processor 3h-20 generates complex symbols by coding and modulating a transmission bit stream. Furthermore, when data is received, the baseband processor 3h-20 reconstructs a reception bit stream from a baseband signal received from the RF processor 3h-10 through modulation and demodulation. For example, if the OFDM scheme is applied, when data is transmitted, the baseband processor 3h-20 generates complex symbols by coding and modulating a transmission bit stream, maps the complex symbols to subcarriers 에 mapping, and then configures OFDM symbols through IFFT operation and CP insertion. Furthermore, when data is received, the baseband processor 3h-20 segments a baseband signal received from the RF processor 3h-10 in an OFDM symbol unit, reconstructs signals mapped to subcarriers through FFT operation, and then reconstructs a reception bit stream through modulation and demodulation. The baseband processor 3h-20 and the RF processor 3h-10 transmit and receive signals as described above. Accordingly, the baseband processor 3h-20 and the RF processor 3h-10 may be called a transmitter, a receiver, a transceiver, a communication unit or a wireless communication unit.

The backhaul communication unit 3h-30 provides an interface for performing communication with other nodes within a network. For example, the backhaul communication unit 3h-30 converts a bit stream, transmitted from the primary ENB to another node, for example, an auxiliary ENB or a core network, into a physical signal, and converts a physical signal received from another node into a bit stream.

The storage unit 3h-40 stores data, such as a basic program, an application program, and configuration information for the operation of the primary ENB. Specifically, the storage unit 3h-40 may store information on a bearer assigned to an accessed UE and measurement results reported by a UE. Furthermore, the storage unit 3h-40 may store information, that is, a criterion by which whether to provide a UE with multiple connections or to stop multiple connection is determined. Furthermore, the storage unit 3h-40 provides stored data in response to a request from the controller 3h-50.

The controller 3h-50 controls an overall operation of the primary ENB. For example, the controller 3h-50 transmits/receives a signal through the baseband processor 3h-20 and the RF processor 3h-10 or the backhaul communication unit 3h-30. Furthermore, the controller 3h-50 writes data in the storage unit 3h-40 and reads data from the storage unit 3h-40. To this end, the controller 3h-50 may include at least one processor (e.g., a multi-connection processor 3h-52).

In accordance with an embodiment of the disclosure, when data is transmitted, overhead can be reduced, radio resources can be efficiently used, and unnecessary processing of a UE can be minimized.

Certain aspects of the disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the disclosure can be easily construed by programmers skilled in the art to which the disclosure pertains.

At this point it should be noted that the various embodiments of the disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the disclosure as described above. Alternatively, one or more processors operating in accordance with stored instructions may implement the functions associated with the various embodiments of the disclosure as described above. If such is the case, it is within the scope of the disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the disclosure can be easily construed by programmers skilled in the art to which the disclosure pertains.

While the disclosure has been shown and described with reference to various embodiments thereof, it will be understood by those skilled in the art that various changes in from and details may be made therein without departing from the spirit and scope of the disclosure as defined by the appended claims and their equivalents.

What is claimed is:

1. A method of processing a radio link control (RLC) unacknowledged mode (UM) protocol data unit (PDU) based on an RLC UM service data unit (SDU) by a transmitter in a wireless communication system, the method comprising:
identifying whether at least one RLC UM PDU contains a segment of an RLC UM SDU;
in case that the RLC UM SDU is segmented into a plurality of segments, setting a sequence number (SN) in a header of an RLC UM PDU of the at least one RLC UM PDU that contains a segment of the plurality of segments based on a variable value of the SN associated with the at least one RLC UM PDU;
identifying whether the segment that the RLC UM PDU contains maps to a last byte of the RLC UM SDU;
in case that the segment that the RLC UM PDU contains maps to the last byte of the RLC UM SDU, increasing the variable value of the SN associated with the at least one RLC UM PDU; and
in case that the RLC UM SDU is not segmented into the plurality of segments, determining not to set the SN in a header of a RLC UM PDU that contains the RLC UM SDU completely.

2. The method of claim 1, further comprising:
setting the SN in a header of another RLC UM PDU of the at least one RLC UM PDU that contains another segment of the plurality of segments,
wherein the SN of the RLC UM PDU is same as the SN of the another RLC UM PDU.

3. The method of claim 1, further comprising:
in case that the segment that the RLC UM PDU contains does not map to the last byte of the RLC UM SDU, maintaining the variable value of the SN associated with the at least one RLC UM PDU.

4. The method of claim 1,
wherein the SN set in the header of the RLC UM PDU is set in an SN field of the header of the RLC UM PDU.

5. The method of claim 4, further comprising:
receiving, on higher layer signaling, configuration information associated with a number of a bit of the SN field of the header of the RLC UM PDU.

6. The method of claim 1,
wherein, in case that the RLC UM PDU carries a first segment of the plurality of segments, a segmentation offset (SO) field is not included in the header of the RLC UM PDU.

7. A transmitter for processing a radio link control (RLC) unacknowledged mode (UM) protocol data unit (PDU) based on an RLC UM service data unit (SDU) in a wireless communication system, the transmitter comprising:
a transceiver;
at least one processor coupled with the transceiver and configured to:
identify whether at least one RLC UM PDU contains a segment of an RLC UM SDU,
in case that the RLC UM SDU is segmented into a plurality of segments, set a sequence number (SN) in a header of an RLC UM PDU of the at least one RLC UM PDU that contains a segment of the plurality of segments based on a variable value of the SN associated with the at least one RLC UM PDU,
identify whether the segment that the RLC UM PDU contains maps to a last byte of the RLC UM SDU, and
in case that the segment that the RLC UM PDU contains maps to the last byte of the RLC UM SDU, increase the variable value of the SN associated with the at least one RLC UM PDU, and
in case that the RLC UM SDU is not segmented into the plurality of segments, determine not to set the SN in a header of an RLC UM PDU that contains the RLC UM SDU completely.

8. The transmitter of claim 7, wherein the at least one processor is further configured to set the SN in a header of another RLC UM PDU of the at least one RLC UM PDU that contains another segment of the plurality of segments,
wherein the SN of the RLC UM PDU is the same as the SN of the another RLC UM PDU.

9. The transmitter of claim 7, wherein the at least one processor is further configured to, in case that the segment that the RLC UM PDU contains does not map to the last byte of the RLC UM SDU, maintain the variable value of the SN associated with the at least one RLC UM PDU.

10. The transmitter of claim 7, wherein the SN set in the header of the RLC UM PDU is set in an SN field of the header of the RLC UM PDU.

11. The transmitter of claim 10, wherein the at least one processor is further configured to control the transceiver to receive, on higher layer signaling, configuration information associated with a number of a bit of the SN field of the header of the RLC UM PDU.

12. The transmitter of claim 7,
wherein, in case that the RLC UM PDU carries a first segment of the plurality of segments, a segmentation offset (SO) field is not included in the header of the RLC UM PDU.

* * * * *